(12) United States Patent
Fischer et al.

(10) Patent No.: US 6,220,109 B1
(45) Date of Patent: Apr. 24, 2001

(54) METHOD AND APPARATUS FOR ACTUATING A TRANSMISSION

(75) Inventors: Robert Fischer, Bühl; Gunter Hirt, Lichtenau-Scherzheim; Norbert Esly, Bühl; Andreas Rogg, Bühl-Vimbuch, all of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/457,271

(22) Filed: Dec. 8, 1999

Related U.S. Application Data

(62) Division of application No. 08/834,812, filed on Apr. 3, 1997, now Pat. No. 6,003,649.

(30) Foreign Application Priority Data

Apr. 3, 1996 (DE) .............................................. 196 13 528
Nov. 4, 1996 (DE) .............................................. 196 45 358

(51) Int. Cl.⁷ .................................................. F16H 59/00
(52) U.S. Cl. .......................................................... 74/337.5
(58) Field of Search ................................ 74/335, 337.5, 74/473.12

(56) References Cited

U.S. PATENT DOCUMENTS 4,745,822 * 5/1988 Trachman et al. .................... 74/335
5,689,997 * 11/1997 Schaller ................................ 74/335
5,836,207 * 11/1998 Spooner et al. ....................... 74/335
5,867,092 * 2/1999 Vogt ..................................... 74/335
5,884,526 * 3/1999 Fogelberg ............................ 74/335
6,003,395 * 12/1999 Rogg et al. .......................... 74/335
6,003,649 * 12/1999 Fischer et al. ...................... 192/3.58

* cited by examiner

*Primary Examiner*—Dirk Wright
(74) *Attorney, Agent, or Firm*—Darby & Darby

(57) ABSTRACT

The present invention proposes a power train and the operation thereof, suitable for automated actuation of a transmission shiftable between a plurality of gears with a torque transmitting system being actuated automatically at least during a gear change, at least one actuating element operable by at least one drive unit and at least one actuatable shift element being disposed at the transmission side. The invention provides a power train in which a driving connection is disposed between at least one actuatable shift element associated with the transmission and an actuator having at least one drive unit, and at least one presettable elastic means is provided in the power transmitting path of the driving connection between the drive unit and the at least one shift element. Further, at least one additional presettable elastic element can be disposed in the power transmitting path between the at least one actuating element and the at least one shift element on the transmission side.

52 Claims, 25 Drawing Sheets

Fig. 3
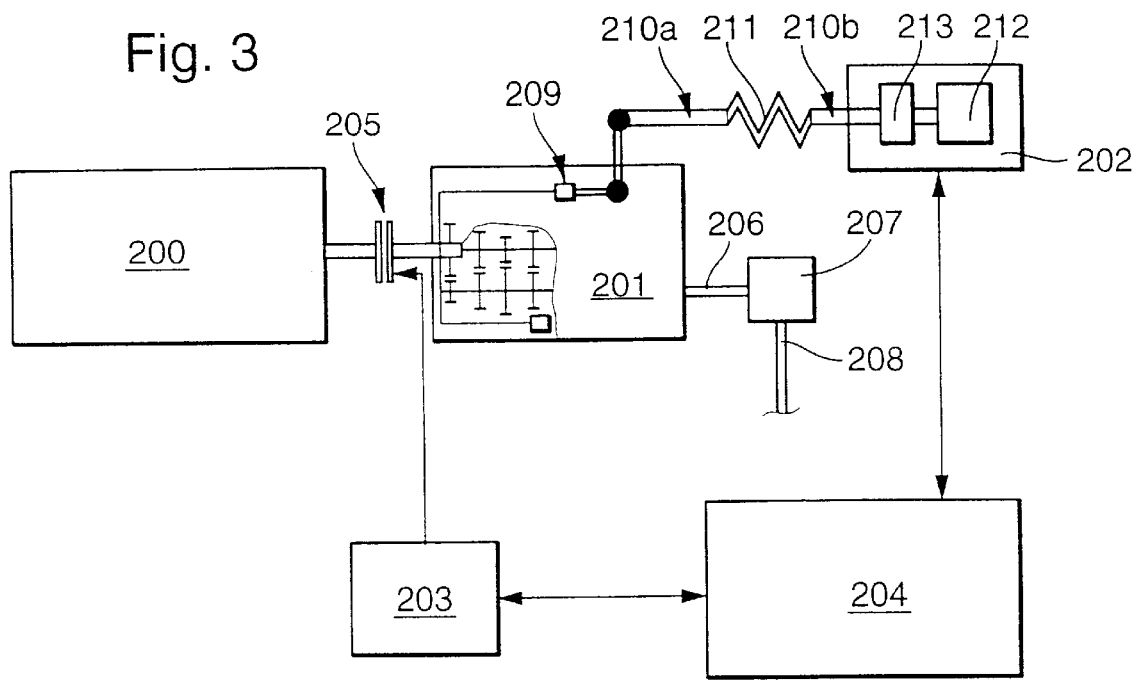
Fig. 4
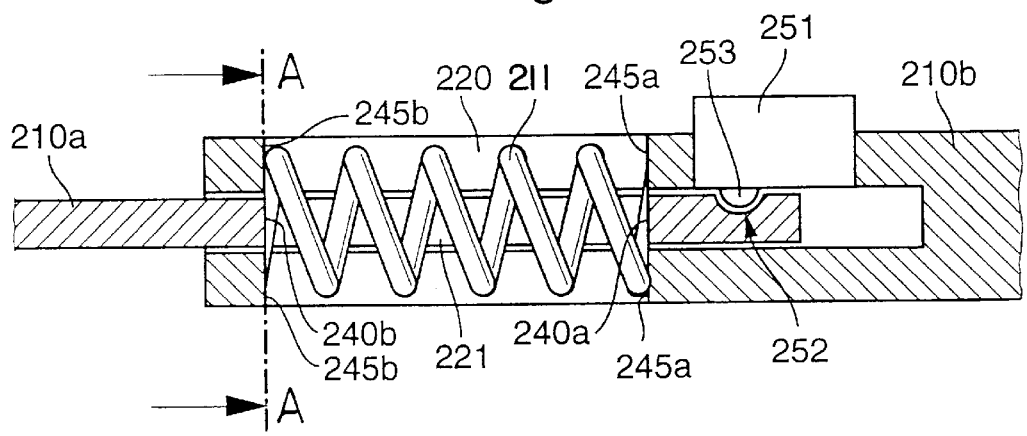
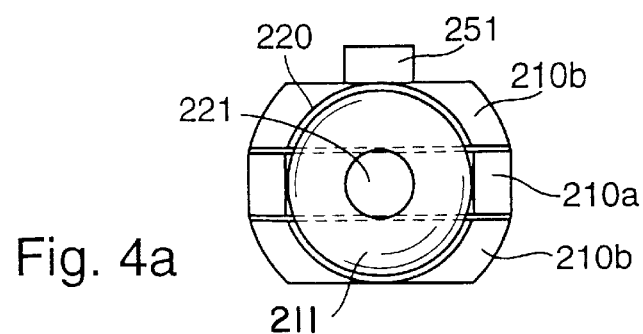
Fig. 4a

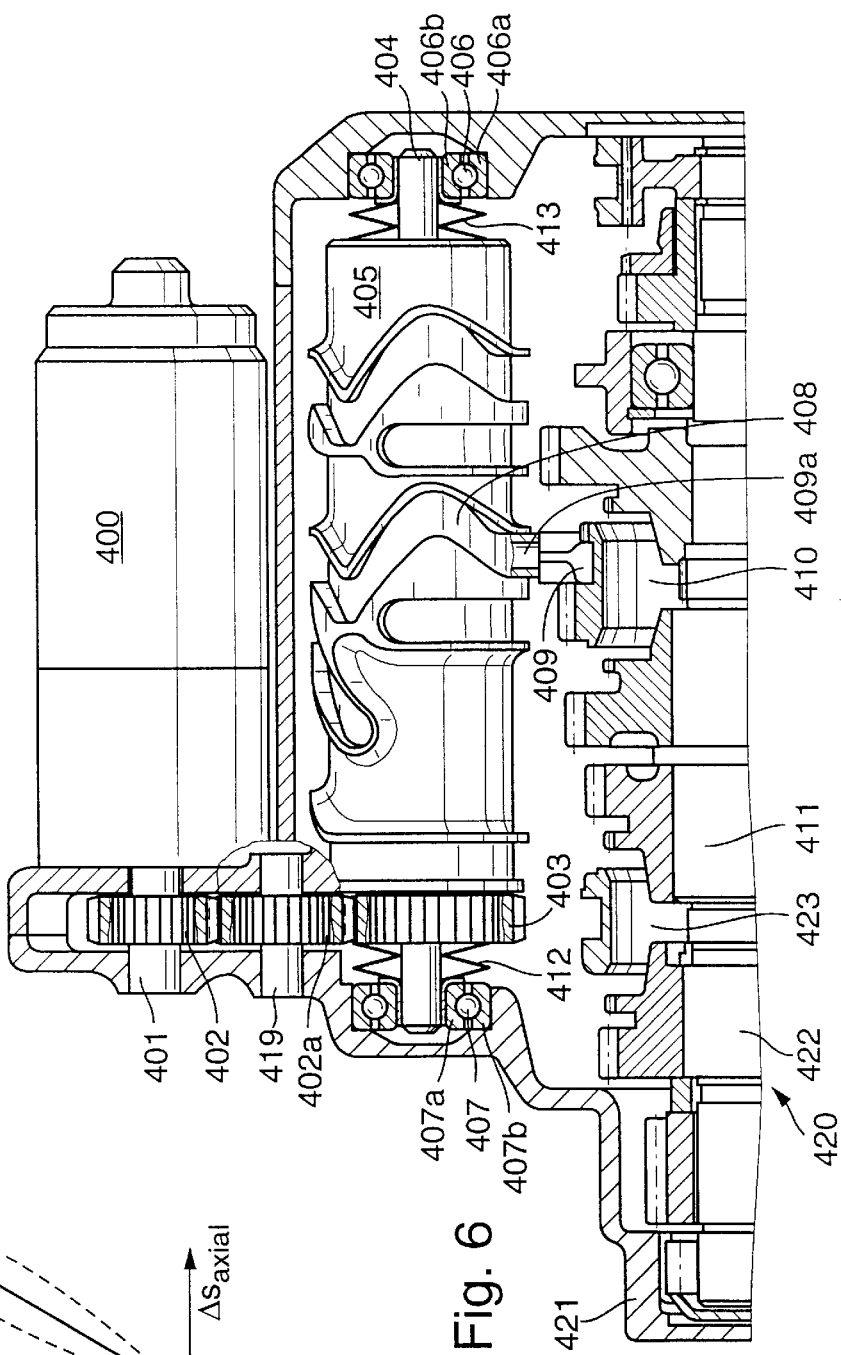
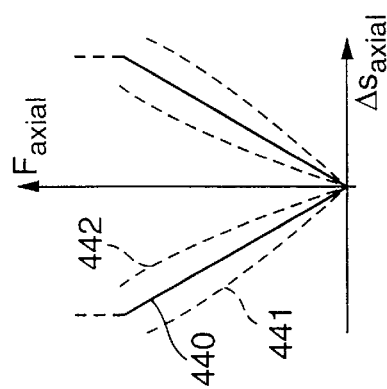
Fig. 6
Fig. 6a

METHOD AND APPARATUS FOR ACTUATING A TRANSMISSION

This application is a divisional of Ser. No. 08/834,812 filed Apr. 3, 1997 now U.S. Pat. No. 6,003,649.

BACKGROUND OF THE INVENTION

The present invention relates to a method and an apparatus for automated actuation of a transmission shiftable between a plurality of gears with a torque transmitting system being actuated automatically at least during a gear change, at least one actuating element actuatable by at least one rive unit and at least one actuatable shift element disposed at the transmission side.

Systems of this type are known in the art. Manufacturing tolerances and/or different nominal dimensions resulting from the machining of transmission, actuator and parts thereof may cause the transmission-internal shift elements to move into a final position when the transmission is actuated for shifting, before the drive unit or the actuating elements are in their respective final positions. When these actuating elements subsequently assume their respective final positions and are actuated, the transmission-internal shift elements are stressed beyond their final positions, which causes increased wear or a malfunction.

SUMMARY OF THE INVENTION

An object of the invention is to provide an apparatus which, in spite of the existing tolerances and/or different nominal dimensions caused during the machining of the apparatus, provides an improved functionality.

Another object of the invention is to provide an apparatus which ensures a more satisfactory operational reliability and operativeness and, at the same time, can be produced in a simple and inexpensive manner.

This is accomplished with the novel apparatus in that a driving connection is provided between at least one actuatable shifting element on the transmission side and at lest one drive unit, and that additional presettable elasticity of an elastic means and/or a presettable elastic element is provided in the power transmitting path of the driving connection between the at least one drive unit and the at least one shifting element.

It is of advantage if the additional presettable elastic element is disposed in the power transmitting path between the actuating element and the at least one shift element on the transmission side.

It can also of advantage if the additional presettable elastic element is disposed in the power transmitting path between a drive unit and the actuating element.

This can also be accomplished wherein an apparatus for automated actuation of a transmission shiftable between a plurality of gears wherein a torque transmitting system is actuated automatically at least during a gear change, at least one actuating element is actuatable by at least one drive unit and at least on actuatable shifting element is disposed at the transmission side, by providing a driving connection between the at least one actuatable shifting element at the transmission side and the at least one drive unit, and in that in the power transmitting path of the driving connection between the at least one drive unit and the at least one shifting element, there is movably arranged—by way of at least one elastic element—an actuating element for moving relative to the elastic element.

It may be of advantage if an actuating element in the power transmitting path between the drive unit and the transmission-internal shifting elements is moveable with respect to the at least one elastic element.

It may also of advantage if the additional elastic element is an energy storing device, such as a spring or a plastic part.

Furthermore, it may be of advantage if the elastic element consists of at least one initially stressed (prestressed) energy storing device.

However, it also within the purview of the invention, if the elastic element consists of at least one energy storing device which is not initially stressed.

In accordance with a further novel concept, a method and an apparatus are provided for actuation of an automated transmission which is shiftable between a plurality of gears by a torque transmitting system which is actuated automatically at least during a gear change, at least one actuating element being actuatable by at least one drive unit and at least one actuatable shifting element being disposed at the transmission side and wherein at least one drive unit initiates a selection between shifting channels of the transmission and at least one drive unit effects a gear shifting with a shifting channel of the transmission. A driving connection is provided between the at least one actuatable shifting element at the transmission side and each of the drive units, and an additional presettable elastic means or an additional element having a presettable elasticity is provided between at least one of the drive units and the at least one shifting element.

It may be of advantage if the elastic means is disposed in the power transmitting path between a drive unit for selecting a shifting channel and a shifting element.

Further, it can be of advantage if the elastic means is disposed in the power transmitting path between a drive unit for selecting a shifting channel and a shifting element. Further, at least one additional presettable elastic means or an additional element with a presettable elastic means can be disposed in the linkage of at least one actuatable shifting element. Also, the at least one additional presettable elastic means or the additional element with the presettable elastic means can be disposed in the support region for an actuating element.

A linkage is any connection between two elements. The linkage can be disposed within the power transmitting path or in the area of a support, for example, a bearing. The support may be an axial support of a rotatable element or a rotatable support of a displaceable element.

It may be of advantage if the additional at least one elastic element with a presettable elasticity is disposed in the power transmitting path between the at least one actuating element and the at least one shifting element disposed at the transmission side; or, between the drive unit and the at least one actuating element.

Also, the apparatus of the invention provides a driving connection between the at least one actuatable shifting element on the transmission side and the at least one drive unit wherein, in the power transmitting path of the driving connection between the drive unit and the at least one shifting element, there is disposed an actuating element which is movable in relation to the elastic element by way of at least one elastic element or by way of an additional element.

It can be of an advantage if an actuating element in the power transmitting path between the drive unit and the transmission-internal shifting elements is moved axially and/or rotated with respect to at least one elastic element. The driving connection includes at least two elements which can be moved axially and/or rotated in relation to at least one elastic means.

In accordance with a further novel concept, it can be of advantage if the at least one elastic means is arranged between an axially movable and/or rotatable element for operating transmission-internal shifting elements and a moveable or stationary element.

The driving connection may include at least two elements which can be moved axially and/or rotated in relation to at least one elastic means, and these at least two elements form at least one support for the elastic means wherein the elastic means is supported under force load.

It can be of advantage if the at least two elements which are moveable with respect to each other can be moved with respect to each other by force-loading the elastic means. Although these two elements can be moved with respect to each other, they can be limited in their relative movement by the force-load of the elastic means. However, it may also be of advantage if the relative movement between the two elements is not restricted.

Furthermore, it can be of advantage if a slip clutch provides a substantially unrestricted relative moveability between the at least two elements.

It can also be of advantage if the elements are moved with respect to each other only after at least one of the elastic means has been biased with a certain presettable force. The elastic element serves as an energy storing device, such as a spring, e.g. a compression spring, tension spring, coil spring, disk spring, leg spring, torsion spring, bracing spring or another spring type or a plastic element of an elastomeric part.

It may be of further advantage if the spring displacement of the at least one elastic means is restricted, if the spring displacement of the at least one elastic means is restricted by a stop and if the elastic means is characterized by a single-step or multi-step characteristic curve. Further, it is also advantageous if the elastic means is installed with or without play. Another advantage can be achieved if the characteristic curve of the elastic means is a function of the relative movement between two elements and has at least one characteristic region where a branch of the characteristic curve slopes upwardly.

It may also be of advantage is the characteristic curve of the elastic means is a function of the relative movement between two elements and has at least one characteristic region where a branch of the characteristic curve is substantially constant.

According to another novel concept, it may be of advantage if the characteristic curve of the elastic means is a function of the relative movement between two elements and has at least one characteristic region where, as a result of play, a branch of the characteristic curve is indicative of zero force.

It is advantageous if, during the actuation, the displacement and/or force can be measured by a force sensor and/or displacement sensor via a multi-step characteristic curve. Also, it is of advantage if between at least one drive unit and at least one actuatable element there is disposed, if necessary, a gear for converting the drive movement into an operating motion. In this context, it may be of advantage if the at least one gear provides step-up or step-down conversion of the rotational speed and/or torque.

Further, it is of advantage if at least one drive unit is an electric motor, a hydraulic, air-oil or pneumatic drive or a drive storing a spring force. Further, it is also advantageous if the driving connection between the drive unit and the actuatable shift element comprises, for example, a linkage, a fluid path, a lever, a Bowden cable or the like.

It is also of advantage if a transmission-internal shift element is, for example, a selector fork, and/or a selector shaft and/or a sliding selector shaft and/or a shift lever and/or a slider sleeve. Further, it may also be of advantage if an actuating element is, for example, a selector shaft and/or a sliding selector shaft and/or a drum and/or a cam mechanism and/or a shift lever and/or a different actuating element.

According to another novel concept, it may be advantageous, if between the actuatable element and the drive unit disposed substantially in the power transmitting path or in the region where an actuatable element in the power transmitting path is supported, there is disposed the elastic means or an elastic element.

According to yet another novel concept, it may be of advantage if a method is employed for controlling the operation of the transmission or is used in conjunction with the operation of the transmission or with an apparatus which controls the operation of the transmission. Operating the transmission may include shifting into, selecting and engaging a gear and shifting into neutral, and/or it may include a procedure which is a combination of the above operations.

It may be of advantage if during operation of the transmission, a selection is only initiated when the shifting operation has reached a neutral position.

It may also be of advantage if during operation of the transmission, a selection operation is already initiated, whereby an elastic means is stressed, before the shifting operation has reached a neutral position.

It may also be of advantage if the selection process can at least partly be initiated by prestressed elastic means when the shifting operation has reached the neutral position.

Further, it may also be advantageous if in a shifting and/or selection operation the drive unit can continue to operate at least temporarily after a shifting and/or selection element reaches a stop, and that an energy storing device is energized during the continuing operation.

Other objects and features of the present invention will become apparent from the following detailed description in conjunction with the accompanying drawings. It is to be understood, however, that the drawings are intended solely for the purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 3 is a schematic illustration of a third power train;

FIG. 4 shows a detail in the power train of FIG. 3;

FIG. 4a is a cross-section taken along line A—A in FIG. 4;

FIG. 6 is a fragmentary cross-sectional view of a transmission;

FIG. 6a is a diagram showing an axial force $F_{axial}$ as a function of the axial displacement $\Delta s_{axial}$ in the transmission of FIG. 6;

FIGS. 15–16a are sectional views of the actuator of FIG. 14;

FIG. 18b is a sectional view taken along line A—A in FIG. 18a;

DETAILED DESCRIPTION OF THE PRESENTLY PREFERRED EMBODIMENTS

Figure 1:
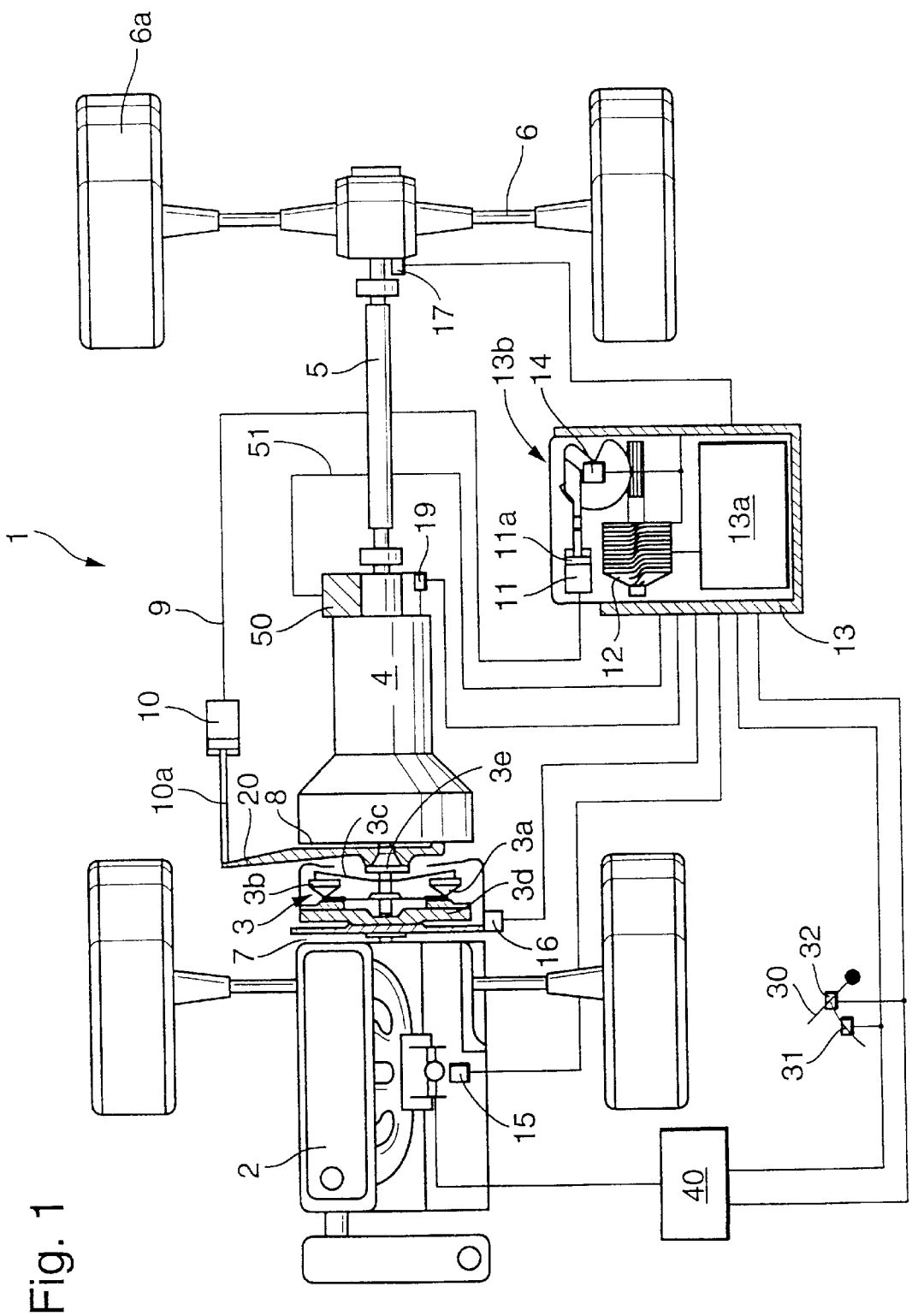
FIG. 1 is a schematic representation of a vehicle with a power train embodying the present invention.

In FIG. 1, there is schematically depicted a motor vehicle 1 with a prime mover 2, such as a motor or an internal combustion engine. The vehicle has a power train including an automatically actuatable torque transmitting system 3 and a transmission 4. In this embodiment, the torque transmitting system 3 is disposed between the prime mover 2 and the transmission. The torque transmitting system 3 transmits torque from the prime mover 2 to the transmission 4, and the output element of the transmission 4 transmits torque end to a drive shaft 5 and an axle 6 for the driven wheels 6a.

The transmission 4 may also be located upstream of the torque transmitting system 3, such as a clutch, e.g., a friction clutch. The torque transmitting system may also constitute a starting clutch and/or a clutch serving to reverse the direction of rotation and/or a safety clutch with an operator-selected transmittable torque.

The torque transmitting system may also constitute a multi-disk clutch, a magnetic powder clutch or a torque converter with torque converter bypass clutch. The system 3 may also be a self-adjusting clutch with automatic compensation for wear.

The disclosures of German patent applications DE 42 39 291, DE 43 06 505, DE 42 39 289 and DE 43 22 677 are incorporated herein by reference.

According to the invention, the transmission 4 may be an automatic transmission with or without interruption of tractive force during shifting, for example, with an interruption of tractive force, which can be operated, such as shifted, automatically via at least one actuating unit 13. The actuating unit 13 controllably initiates, with or without feedback, the changes in gear ratio. In a closed-loop process, hereinafter called regulated process, an output quantity is processed via feedback in a closed control loop. In an open-loop process, hereinafter called controlled process, an actuating variable is controlled open-loop without feedback.

In the following parts of this specification, the term automated transmission denotes an automatic transmission which is shifted with an interruption of tractive force and wherein the shifting into a selected gear ratio is controllably executed upon activation through at least one actuator or actuating unit. In addition, an automatic transmission may also be employed as a part of a composition transmission with another downstream transmission, wherein such automatic transmission is a transmission which does not require interruption of the tractive force during the shifting operation and which may be assembled of planetary gear stages. A continuously variable transmission (CVT) may also be employed as a part of a composite transmission.

The torque transmitting system 3 comprises a drive end or input end 7 and an output end 8. Torque is being transmitted from the drive end 7 to the output end 8 by applying a force to a clutch disk 3a via a pressure plate 3b, a clutch spring 3c and a throw-out bearing 3e and by frictionally pressing the clutch disk 3a against a flywheel 3d. For applying the force, a clutch disengaging fork lever 20 is operated through an operating means, such as an actuator. A mechanical or hydraulic release, such as a central release disposed coaxially with transmission shaft, may also be used.

The automated torque transmitting system 3 and/or automated transmission is controlled through the at least one control unit 13, such as a control device, which may include control electronics 13a and at least one actuator 13b. In another advantageous embodiment, the at least one actuator unit and the at least one control electronics may also be disposed in two discrete enclosures, such as housings, and in such embodiments the actuating means and the control electronics may also be remote from each other.

The control electronics 13a can include the control and power electronics for at least one motor 12 of the at least one actuator 13b. The control and power electronics may be placed externally or in an electric motor or in a drive unit of the actuator. The actuator 13b comprises or consists of the at least one motor 12, such as an electric motor, and can also include a gearing for transforming the rotary movement of the drive shaft of the drive motor into a different movement. A preferred embodiment provides that the electric motor 12 acts on an element for operating the clutch or the transmission, for example a master cylinder 11, via a gear, such as a worm gear or spur gear or a system of cams of a threaded spindle gear. The master cylinder 11 may be driven directly or via levers. The actuating motion may also be transmitted directly to a mechanically actuatable element.

The position and the movement of the output side of the at least one actuator, such as the master cylinder piston 11a, can be monitored by a displacement sensor 14 which detects the position and/or the velocity and/or acceleration of a quantity that is proportional to the position or engaging position or to the velocity or acceleration of the clutch, respectively, or of an element activating the transmission.

The master cylinder 11 is connected to the slave cylinder 10 via fluid conveying conduit 9, such as a hydraulic line. The output element 10a of the slave cylinder is operatively connected with the clutch disengaging fork lever or release means 20, so that a movement of the output element 10a of the slave cylinder 10 causes the release means 20 also to move or pivot for controlling the torque transmitted by the clutch 3.

The actuator 13b for controlling the transmittable torque of the torque transmitting system 3 and/or the automated transmission may be adapted for hydraulic operation, i.e. the actuator 13b may be provided with hydraulic master and slave cylinders. The pressure medium may be, for example, a hydraulic fluid or a pneumatic medium. The hydraulic master cylinder may be operated by an electric motor wherein the electric motor may be electronically controllable. Aside from an electric motor, the drive element of actuator 13b may also be a different drive element, for example a hydraulically operated drive element. Magnetic actuators may also be employed for setting the position of an element. Furthermore, the drive may include only an electric motor without an intervening hydraulic path.

With a friction clutch, the transmittable torque is controlled by intentionally applying pressure to the friction pads of the clutch disk between the flywheel 3d and the pressure plate 3b. The pressure applied between the pressure plate and the friction pads can be intentionally controlled via the position of the release means 20, such as clutch disengaging fork or central release, wherein the pressure plate can be moved and freely adjusted and fixed between two final (end) positions. One of the final positions corresponds to a completely engaged clutch position, the other final position corresponds to a completely disengaged clutch position. For controlling a transmittable torque, for example a torque smaller than the momentarily applied engine torque, the pressure plate 3b may, for example, be maintained in a position disposed between the two final positions. The clutch can be fixed in such position by actively controlling the release means 20 in that position. However, transmittable clutch torques with well defined values greater than the actual applied engine torques, may also be controlled. In this case, the momentarily applied engine torques may be transmitted, whereby the torque irregularities in the power train which manifest themselves, for example, as peak torques, are damped and/or isolated.

Furthermore, for controlling or regulating the torque transmitting system, there are employed sensors which at least at times monitor the relevant parameters of the entire system, such as the vehicle, and provide the status variables, signals and measurement values which are required for the control operation and which are transmitted to, stored in and/or processed by the control unit. Depending on the operating status, the control unit generates control signals which are used and employed for controlling the actuator(s). There may also exist a signal link to other electronic units, for example to an engine electronic unit or to electronics of an anti-blocking system (ABS) or an anti-slip control (ASR). The electronic units may, for example, communicate via a data bus. The sensors measure, for example, rotation speeds, such as wheel rotation speed, engine RPM, the position of the load lever, the throttle position, the momentary gear of the transmission, a shifting intent as well as other vehicle-specific parameters.

In FIG. 1, there are depicted a throttle position sensor 15, an engine RPM sensor 16 and a tachometer sensor 17, which supply measurement values and information, respectively, to the control unit. The electronic unit 13a, such as computer unit, of the control unit 13 processes the system input values and transmits control signals to the at least one actuator 13b.

The transmission 4 is constructed as a gear change box with tractive force interruption, wherein the gear ratios are changed via actuator 50 with drive unit or wherein the transmission is initiated or activated via the actuator 50. The actuator 50 is only shown schematically, with a control or signal link 50 provided to the control unit 13.

The actuator 50 may, for example, be constructed as a camshaft controller actuator or as an electro-mechanical, such as electric motor driven, actuator with drive unit and gear or as a pneumatically operated actuator. The actuator 50 may be formed separately from or placed in the same module as the actuator 13b for controlling the torque transmitting system 3.

A sensor unit 19 with at least one sensor can be connected to the transmission 4 via a linkage for detecting the current gear position and/or the movement of transmission-internal shift elements for operating the transmission or for setting the gear ratio. Such sensor unit may also be installed at a different location for detecting the current gear position. In addition, the current gear position may also be calculated from data, such as rotational (RMP) data.

The control unit 13 is, at least temporarily, in signal communication with individual and/or all sensors and evaluates the sensor signals and system input values in a manner that, depending on the actual operating point, the control unit transmits control commands to at least one of the actuators 13, 50. The drive element of the actuator, such as electric motor, receives from the control unit which controls the operation of the clutch, a controlling variable depending on the measurement values and/or system input values and/or signals of the connected sensor means. For this purpose, a control program is implemented in the control unit in form of hardware and/or software for evaluating the incoming signals and calculating and determining the outgoing values based on a comparison and/or functions and/or mapping.

The control unit 13 advantageously includes a torque determining unit, a gear position determining unit, a slip determining unit and/or an operating condition determining unit and is in signal communication with at least one of these units. The units may be implemented through control programs as hardware and/or as software, for enabling through the incoming sensor signals, the determination of the torque of the prime mover 2 of the vehicle 1, the gear position of the transmission 4 as well as the slip occurring in the region of the torque transmitting system and the current operating status of the vehicle.

The gear position determining unit evaluates the momentarily engaged gear based on the signals from the at least one sensor 19. Sensors may also be connected to transmission-internal actuating means, such as a central selector shaft or sliding selector shaft, for detecting, for example, the position and/or speed of the element(s). From the signals received from the gear position determining unit, there can be determined a position within a selection path and/or within a shifting path. In addition, a load lever sensor 31 may be disposed at the load lever 30, such as a gas pedal, for detecting the load lever position. Another sensor 32 may function as an idle switch, wherein said idle switch 32 is engaged when the gas pedal, e.g. load lever, is operated, and is disengaged when no signal is present, so that this digital information make it possible to recognize if the load lever, e.g. gas pedal, is activated. The load lever sensor 31 detects the extent to which the load lever is activated. An idle switch may be simulated by using the signals from the load lever sensor and by processing these signals with established methods, whereby no activation takes place for load lever signals below a presettable threshold is present and whereby a bit or signal corresponding to an idle switch is set.

Figure 2:
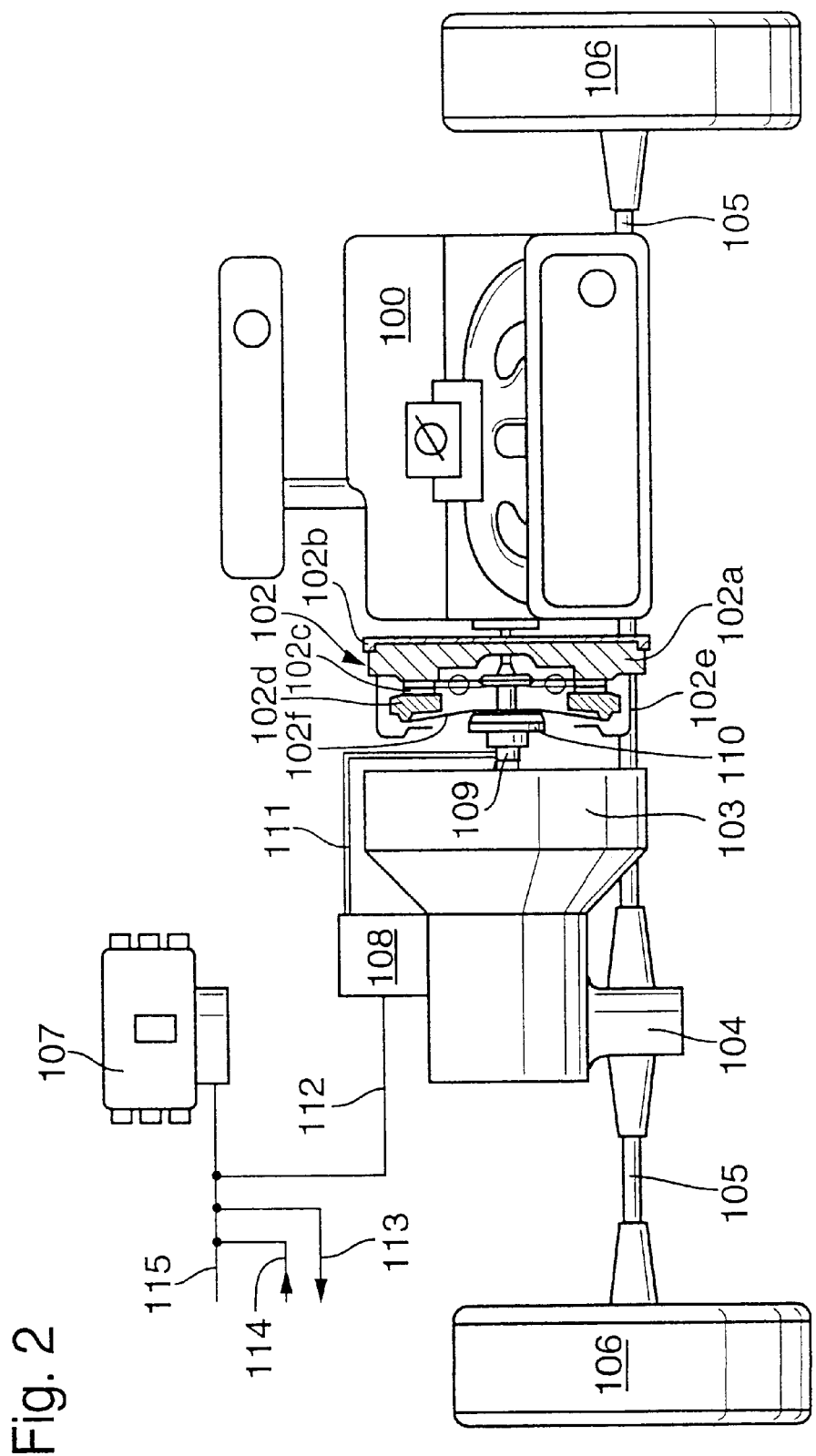
FIG. 2 is a schematic illustration of a modified power train.

FIG. 2 shows schematically a power train of a vehicle with a drive unit 100, a torque transmitting system 102, a transmission 103, a differential 104 as well as drive axles 105 and wheels 106. The torque transmitting system 102 is disposed on or at a flywheel 102a and secured thereto, wherein the flywheel is in general provided with a starter gear 102b. The torque transmitting system comprises a pressure plate 102d, a clutch cover 102e, a disk spring 102f and a clutch disk 102c with friction pads which are disposed on the clutch disk radially away from the center. If necessary, the clutch disk 102c between the pressure plate 102d and the flywheel 102a is provided with a damping device, for example a torsional oscillation damper. The energy storing device, namely disk spring 102f, urges the pressure plate axially in the direction towards the clutch disk. A clutch actuating element 109, for example a hydraulically or pneumatically operated central release, is provided for operating the torque transmitting system 2. Between the central release element 109 and the prongs of disk spring 102f, there is disposed a release bearing 110. The disk spring 102f is activated by an axial displacement of the release bearing 110, thereby disengaging the clutch 102. The clutch may be a pull or push-type clutch.

The actuator 108 is the actuator for the automated transmission 103 and for the torque transmitting system 102. The actuator 108 operates transmission-internal shift elements, such as a shift drum or shift rods or a central selector shaft of the transmission, which can operate to engage or disengage the gears, for example sequentially, but also in an arbitrary order. The clutch actuating element 109 is operated through the link 111. A control unit 107 is connected with the actuator 108 through a signal link 112. Signals links 113 to 115 are in signal communication with the control unit, with the link 114 transmitting the incoming signals, the link 113 transmitting control signals from the control unit, and the link 115 providing a connection to other electronic units, for example via a data bus, such as a CAN bus. CAN stands for Controller Area Network.

For starting the vehicle 1 of FIG. 1 from rest or from a slow rolling motion, i.e. for accelerating the vehicle, the driver operates only the gas pedal, i.e., the load lever 30. The controlled or regulated automated clutch activation via the actuator controls the transmittable torque of the torque transmitting system 3 during the starting phase. The request from the driver for weaker or stronger, or more or less rapid acceleration is detected through the load lever sensor 31 when the load lever is operated, and subsequently controlled by the control unit 13. The gas pedal and the sensor signals from the gas pedal are used as input values for controlling the starting phase of the vehicle. The control unit 13 also controls the selection of the gears engaged in the transmission 4 depending on the operation parameters.

Even when the gas pedal 30 is not activated, the brake (not shown) is not activated and when a gear is engaged, the control unit can control a slow forward movement of the vehicle by at least slightly engaging the clutch. The present invention also relates to the previous application DE 44 26 260 which is explicitly incorporated into the present application by reference.

FIG. 3 shows schematically an apparatus according to the invention in an automobile with an engine 200 and an automatically shiftable transmission 201 and an automatically activatable torque transmitting system 205. The torque transmitting system 205 is disposed in the power train between the engine 200 and the transmission 201. The transmission has connected to it, in that order, a transmission drive shaft 206, a differential 207 and a driven axle 208 for transmitting power.

The transmission 201 with its transmission-internal mobile shift elements 209 is operated in an automated mode by the actuator 202. Between the at least one drive unit 212 of the actuator 202 and the transmission-internal shift elements 209, there is disposed at least one two-part actuating element 210a, 210b for transmitting force. The drive unit 212 of actuator 202 includes a gearing 213, such as a step-up or step-down gearing, for operating the actuating element. The gearing 213 may, for example, transform a rotary motion of the drive unit 212 into an axial movement and/or into a movement perpendicular thereto. In addition, the gearing 213 serves to match or optimize the drive motion on the drive end of the drive unit with respect to the required adjusting or shifting speeds or forces. Also provided is a main controlling unit 204 in data transmitting communication with the actuator 202 and connected to a transmission controlling unit 203.

In addition, an elastic means or elastic element 211, e.g. an energy storing device, spring or elastic element, such as a rubber element, is disposed between the drive unit 212 and the transmission-internal shift elements 209 for transmitting force or for supporting forces. The elastic means 211 can be formed as a metallic element or as a plastic or rubber element. The elastic element 211 or the elastic means can be either initially stressed or not initially stressed. If the element 211 is not initially stressed, the elastic element, such as a spring, is positioned unstressed adjacent to two elements 210a, 210b which are moveable with respect to each other, wherein a force is applied to the elastic means by the displacement of the elements 210a, 210b, thereby substantially deforming the elastic element. In addition, the elastic element 211 can also be inserted into a seat in initially stressed form. The element 211 constitutes and elastic portion of the motion transmitting further including the elements 210a, 210b.

If, for example, a gear change is initiated automatically and a gear or a gear ratio is engaged and the transmission-internal shift elements 209 have reached their final positions, before the actuating element has reached its final position, then the transmission components or the components of the operating actuator would disadvantageously experience excessive stress when the actuating element is urged into its final position beyond the position corresponding to the final position of the transmission-internal shift elements. This stress can be diminished or reduced by employing at least one elastic means, when the transmission-internal shift element is in its final position and the actuating element continues to be urged into its respective final position. In this process, the elastic means 211 is at least slightly stressed, thereby compensating for and reducing the force on the system components. The at least one elastic means 211 may be disposed in the force-transmitting path for effecting the shifting operation and/or the selection of the gear ratio.

FIG. 4 shows an actuating element of FIG. 3 in detail. The actuating element consists of the two parts 210a and 210b, also shown in FIG. 3, which mesh in the center region and respectively include indentations 220 and windows 221 for receiving the energy storing device 211, for example, a spring.

If a tensile or compressive force is applied between the parts 210a and 210b, the energy storing device 21 between the parts 210a, 210b is stressed, whereby the energy storing device is elastically deformed and the actuating element 210a, 219b is either shortened or lengthened. The energy storing device is received in a seat formed by the indentations 220 in the part 210b and by the window 221 in the part 210a. The part 210a has surfaces or regions 240a, 240b which form the boundaries in axial direction. The indentations 220 also include end regions 245a, 245b forming axial boundaries which are intended as limit stop regions or end faces.

There is also shown a sensor 251 which is connected to the part 210b and includes a cam 253 engaging in a groove 252 or a recess of the part 210b. When the part 210a is displaced relative to the part 210b, then the cam 253 or pin is guided by the groove, whereby the sensor 251, such as a switch, detects this displacement. If the spring 211 is initially stressed, then this occurs only from a presettable force threshold on, wherein the sensor 251 detects when the threshold force is reached. If the spring 211 is not initially stressed, then a displacement sensor is advantageous, since in this case, the entire region where an elastic deformation takes place, is detected, and consequently the force along the displacement path can be detected.

FIG. 4a shows a section of FIG. 4 taken along line A—A, showing the seating regions 220 and 221, the energy storing device 211 and the sensor 251.

Figure 5:
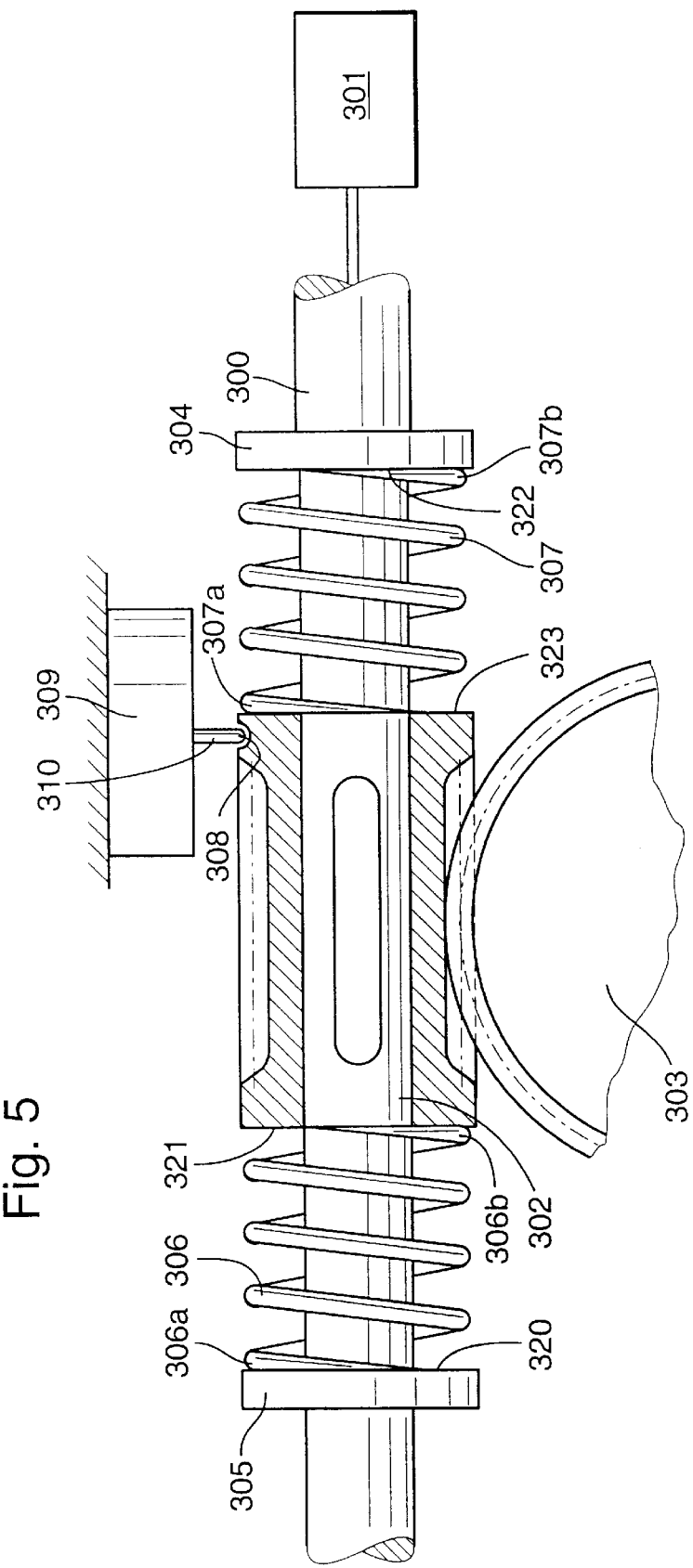
FIG. 5 shows a modification of the structure shown in FIG. 4.

FIG. 5 shows a modified embodiment of the invention with an engine output shaft 300 of a drive unit 301 of the apparatus of the invention. During a shifting operation, the apparatus of the invention operates transmission-internal shift elements, or operates a torque transmitting system when the clutch is operated. A worm 302 is non-rotatably connected to the engine shaft 300, but is free to move axially. The thread of the worm 302 meshes with the thread of a worm gear 303 which drives subsequent actuating elements. Between the threads of the worm gear 303 and the transmission-internal shift elements, there may be connected a gear and/or a linkage, a slider crank or the like. The worm 302 is disposed for axial movement by way of energy storing devices 306, 307 placed between the stops 304 and 305, and the worm can yield axially against the resistance of the energy storing device 306 or 307, when the worm is axially biased.

The energy storing devices 306 and 307 are clamped between final position regions, with the energy storing devices preferably initially stressed. The final position regions 320 and 321 are adapted for locating the energy storing device 306 or for contacting the end convolutions 306a, 306b of the energy storing device, whereas the final position regions 322 and 323 are adapted for locating the energy storing device 307 or for contacting the end convolutions 307a, 307b of the energy storing device. The end convolutions of energy storing devices 306, 307 abut these regions or are supported by these regions.

Also shown is a sensor 309 with a cam 310. The cam 310 engages in a groove 308 in the worm 302 for detecting any initial displacement or the time of any displacement of the worm 302, whereby the sensor detects when the cam travels out of the groove.

FIG. 6 is a sectional view of a transmission 420. The transmission 420 includes a housing 421 with gear wheels 422 and sliding wheels arranged therein. There is also shown a drive unit 400 capable of driving—via a gear train with gear wheels 402, 402a and 403—a drum controller 405 having a cam mechanism or a cam mechanism within the transmission. The gear wheel 402 is supported on a shaft 401. The gear wheels 402a and 403 are supported by other shafts, with the shaft 419 supporting the gear wheel 402a and the shaft 404 supporting the gear wheel 403. The shaft 404 also supports the drum controller 405. The drum controller 405 is rotatably supported by the shaft 404 or by the drum controller shaft 404 and the bearings 406, 407, and the drum controller is axially moveable with respect to the housing 421 when the energy storing device 412 or 412 is stressed.

The energy storing devices 412, 413 engage, on the one hand, an end region, such as an end face, of the drum controller 405 or the gear wheel 403 and, on the other hand, an inner bearing race 406b or 470a. The energy storing devices 412, 413 can also engage the outer bearing races 406a, 407b.

The drum controller 405 is provided at its surface with cam grooves or guiding means 408 for engagement with cam followers 409a of the shifting forks 409. By properly selecting the geometrical arrangement of the grooves, the cam followers can travel along the respective grooves when the drum controller 405 rotates. As a result of the groove geometry, the shifting forks 409 can be displaced axially upon rotation of the drum controller. The shifting forks 409 activate the sliding sleeves or sliding wheels 410 of transmission 420 and establish a driving connection or a torque transmitting connection at a set of gear wheels 411 of the transmission. As a result, a gear or a gear ratio can be engaged or shifted in the transmission.

If the sliding sleeve or sliding wheel 410 is already in its respective final position during a shifting operation, while the drum controller 405 has not yet reached its respective final position, then the drum controller, in this gear position, can rotate until it reaches its respective final position while the drum moves axially against the resistance of the energy storing device 412 or 413, so as not to drive the shifting fork 409, beyond the final position.

The drive unit 400 may be an electric motor, an electromagnetic device or a pressure-activated device. The pressure-activated device may be a hydraulic or a pneumatic device.

FIG. 6a shows a diagram with a plot of an axial force $F_{axial}$ as a function of the axial displacement $\Delta s_{axial}$. The curves 440, 441 and 442 represent possible force-displacement curves, wherein the curve 440 is linear in a first interval and extends almost vertically in the second interval when a limit stop is reached. At that point, the drum controller 405 reaches a limit stop at a presettable axial displacement. The curves 441 and 442 are modifications with a different spring stiffness.

Figure 6B:
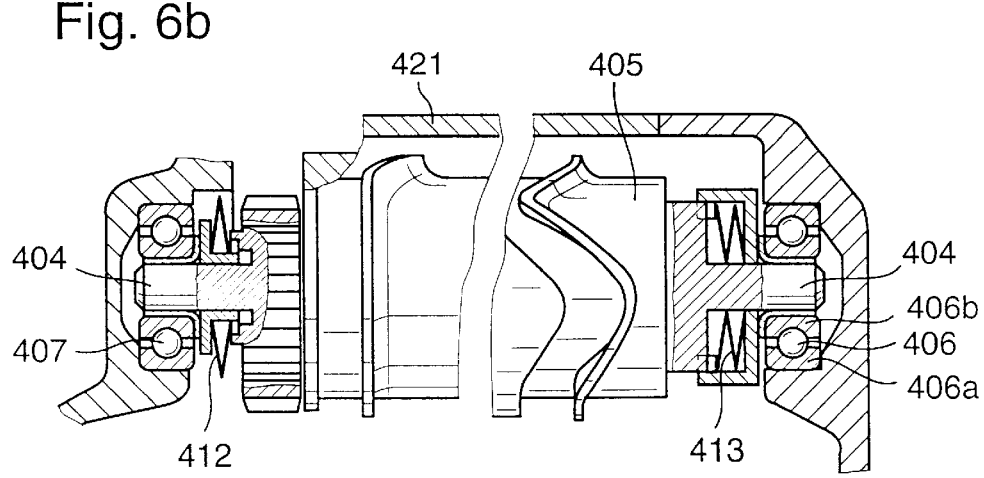
FIG. 6b is a cross-section of a modified partial view of a spring assembly in a transmission.

FIG. 6b shows a partial view of a spring assembly in a transmission adapted to be operated with a rotatable drum controller 405, corresponding to that shown in FIG. 6. Inside the housing 421, the shaft 404 of the drum controller 405 is rotatably supported by bearings 406 and 407.

Figure 6C:
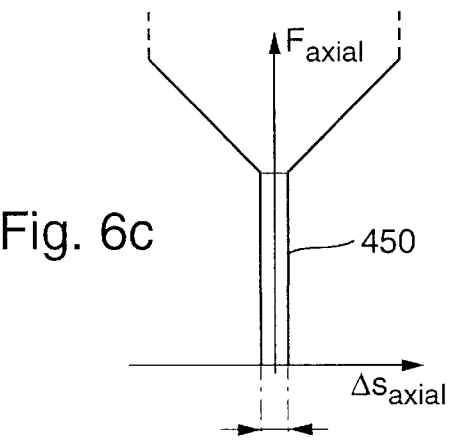
FIG. 6c is a diagram showing a force-displacement in the transmission of FIG. 6b.

FIG. 6c shows a force-displacement diagram resulting from the energy storing device arrangement depicted in FIG. 6b. The curve 450 denoting the force $F_{axial}$ is plotted as a function of the axial displacement $\Delta s_{axial}$, wherein $F_{axial}$ is the force which is to be generated or which is required for a travel or axial displacement $\Delta s_{axial}$. Curve 450 shows a force-displacement plot wherein play is provided in a first travel interval, i.e. a travel interval wherein no force is required for moving the drum controller axially against the force of the energy storing devices 412, 413. In a second travel interval, the force $F_{axial}$ increases linearly as a function of the displacement $\Delta s_{axial}$. Between the region or interval with play and the linearly increasing interval, the force increases almost vertically, while the initial stressed force of the energy storing device has to be overcome. The end region of the linear branch of the curve is formed by the steep increase when the limit stops are reached.

Figure 6D:
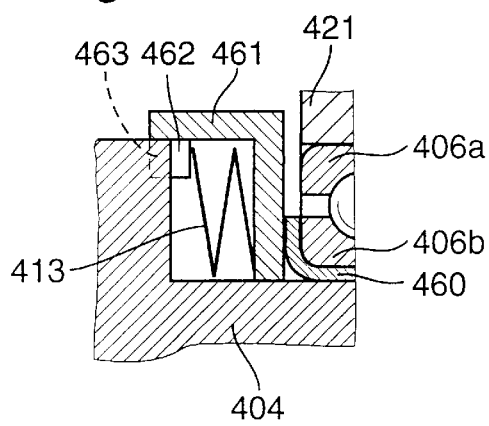
FIG. 6d is a partial view of the structure shown in FIG. 6b.
Figure 6E:
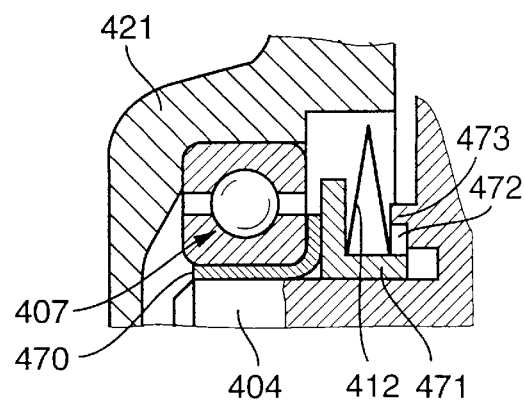
FIG. 6e is another partial view of the structure shown in FIG. 6b.

FIGS. 6d and 6e show partial views of FIG. 6b for illustrating in greater detail the arrangement of the energy storing devices 412 and 413.

In FIG. 6d, the central shaft 404 of the drum controller with cam profile is rotatably supported by the bearings, such as friction bearings or roller bearings, with inner bearing race 406b and outer bearing race 406a. Between the inner bearing race 406b and the shaft 404 there is disposed an adapter element 460. The energy storing device 413 is received between an arm 461 and a shoulder 463 of shaft 404. The two elements 404 and 461 are held together by way of a toothed interlock or a keyway between elements 462 and 463, and are axially moveable, but prevented from rotating relative to each other. The energy storing device 413 is supported, depending on the relative positions of the elements 404 and 461, by at least one of a projection 462 or the shoulder 463. As a result, the extent of relative displacement of the energy storing device 413 is limited.

In FIG. 6e, the central shaft 404 of the drum controller with cam profile is rotatably supported by the bearing 407, such as a friction bearing or a roller bearing. Between the inner bearing race and the shaft 404 there is disposed an adapter element 470. The energy storing device 412 is received between an arm 471 and a shoulder 473 of shaft 404. The two elements 404 and 471 are held together by way of an interlock or a keyway between elements 472 and 473, and are axially moveable, but prevented from rotating relative to each other. The energy storing device 412 is supported, depending on the relative positions of the elements 404, like 473, and 471, by at least one of the projection 472 and the shoulder 473. As a result, the axial displacement of the energy storing device 412 is limited.

Figure 7:
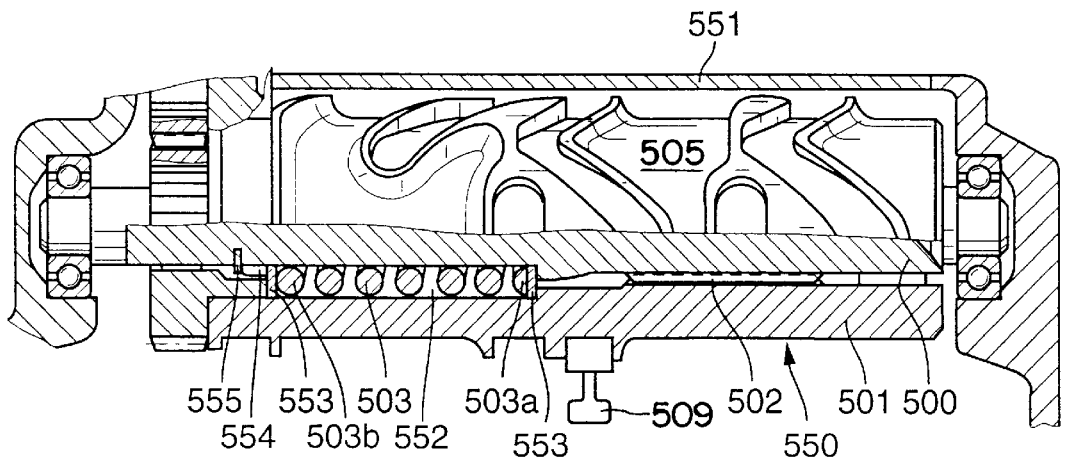
FIG. 7 is a partial cross-section of another embodiment of a transmission.

FIG. 7 is a partial view of a modified embodiment of a transmission 550 of the invention with a housing 551 adapted to receive transmission-internal shift elements. A drum controller 505 is provided for changing the gear ratio of the transmission. The method for driving the drum controller can be inferred from FIG. 6. The drum controller 505 is assembled of several parts and substantially consists of a radially inner drum part 500 and a radially outer drum part 501, and the parts are non-rotatably connected together via a toothed interlock 502. The toothed interlock 502 is formed in such a way that the inner toothed interlock portion on the part 501 meshes with the outer toothed interlock portion on the part 500 so that the parts 500 and 501 are axially moveable with respect to each other. The at least one energy storing device 503 is located in a space 552 between the parts 500 and 501. The energy storing device 503 biases both parts 500 and 501 against axial movement relative to each other when they move at least over a partial interval of a relative displacement. The energy storing device 503 of FIG. 7 is installed in such a way that its end convolutions 503a, 503b abut contact regions. These contact regions are preferably made of ring-shaped elements with the radially inner edge region substantially abutting part 500 and with the radially outer edge region substantially abutting part 501. The ring-shaped elements 553 in turn abut edges or projections formed on the part 500 and/or the part 501. One of the ring-shaped elements 553 abuts the formed stops, while the other ring-shaped element 553 is supported by an element 554; the element 554 in turn is axially supported by a locking ring 555 engaging in a groove, such as a circular groove.

The energy storing device 503 can be located between the elements 553 and initially stressed. The energy storing device 503 can also be disposed between these elements with or without initial stress or with or without play. The energy storing device thus biases the parts 500 and 501 against each other, when a force is applied and/or a relative axial displacement takes place between the parts 500, 501 of the drum controller 505. If a force is applied to part 500 relative to part 501 which is greater than the initial stress of the energy storing device 503, then the parts 500 and 501 are displaced relative to each other, whereby the shifting fork 509 can be stressed or relieved.

Figure 7A:
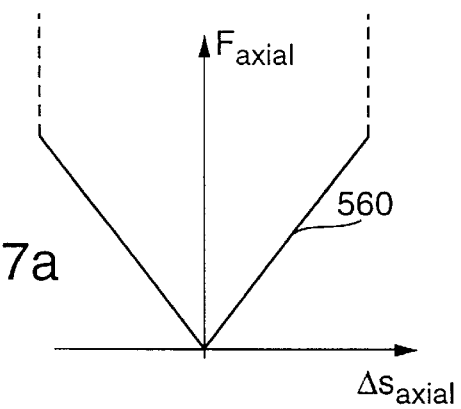
FIG. 7a is a diagram showing an axial force $F_{axial}$ as a function of an axial displacement $\Delta s_{axial}$ in the transmission of FIG. 7.
Figure 7B:
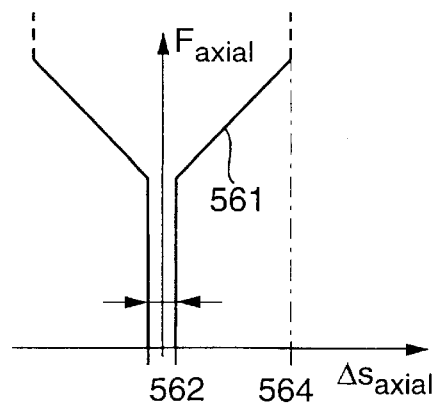
FIG. 7b is another diagram showing an axial force $F_{axial}$ as a function of an axial displacement $\Delta s_{axial}$ in the transmission of FIG. 7.

FIGS. 7a and 7b show diagrams wherein an axial force $F_{axial}$ curve 560 is plotted as a function of the axial displacement or axial travel $\Delta s_{axial}$ between the parts 500 and 501. In FIG. 7a, the curve 560 representing the axial force $F_{axial}$ extends from the origin, i.e. from a displacement of zero, to a maximum displacement, i.e. a displacement corresponding to a limit stop, substantially linearly or according to a different function, wherein the value at $\Delta s_{axial}=0$ starts at $F_{axial}=0$.

In FIG. 7b, there is shown the curve 561 of the axial force $F_{axial}$ from a starting value 562 which is different from zero, with the curve 561 increasing steeply or with a step at 562 subsequently continuing to increase with a finite slope. This means that from a certain displacement on, which is larger than the presettable play, from the value 562 up to a maximum displacement 564 corresponding to travel to a limit stop, the curve 561 is substantially linear or follows a different pattern.

Figures 8, 9:
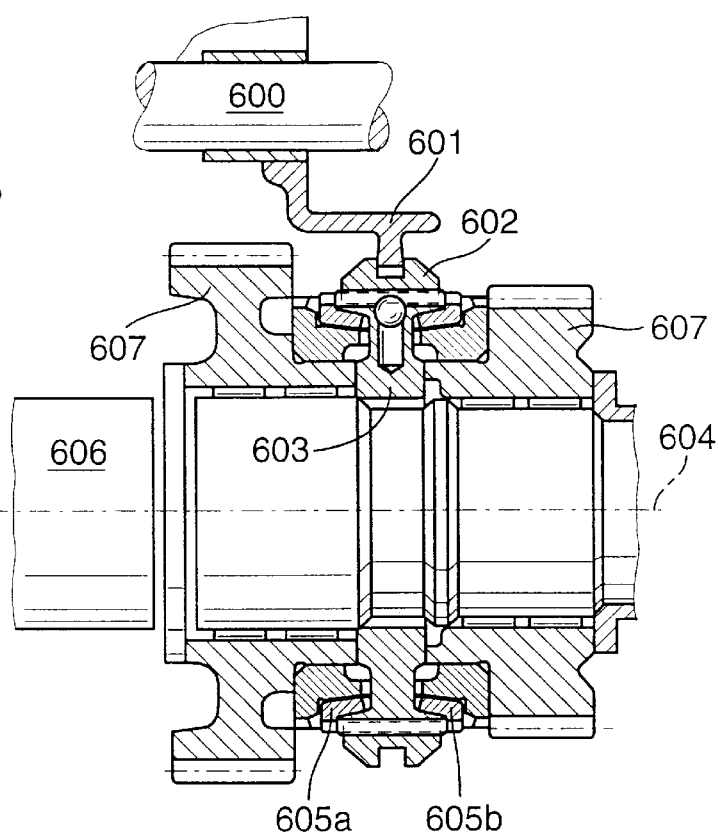
FIG. 8 is a partial view of a further transmission with transmission-internal shift elements.
FIG. 9 shows a gear shifting gate.

FIG. 8 is a partial view of a transmission wherein the gear ratios can be shifted, for example, with a sliding selector shaft or a selector shaft. The transmission may be designed in such a way that a central selector shaft can operate different selector forks 601 via, for example, a sliding selector shaft 600. The illustrated selector fork 601 is, for example, in formfitting engagement with a sliding gear wheel 602. The sliding gear wheel 602 has a hub 603 supported in relation to the axis 604.

In addition, synchronizing rings 605a and 605b are connected to the sliding gear wheel 602. The shift elements for effecting the engagement of a gear or a gear ratio are shown in FIG. 8 by way of example. The shift elements include the sliding selector shaft 600, the selector fork 601, the sliding gear wheel 602, the transmission shaft 606, the synchronizing rings 605a and 605b and the gear wheels 607. For engaging a gear, the selector fork is pressed against the sliding gear wheel, whereby the sliding gear wheel moves axially until the friction torque of the synchronizing ring, through face contact, blocks the movement of the sliding gear wheel. When the hub and the gear wheel have the same rotational speed, the blocking friction torque of the synchronizing ring is eliminated and when the sliding gear wheel 602 continues its travel, the toothed interlock of the sliding gear wheel can reach or establish a formfitting engagement between the hub 603 and a gear wheel 607. When formfitting engagement is reached or accomplished, the gear is engaged and the sliding gear wheel 602 has reached its final position. The final position can advantageously be defined by a stop.

Operation of gear transmissions, such as transmissions with tractive force interruption, may be characterized by a central selector shaft on the transmission, with the central selector shaft transmitting both the shifting activation and the selection activation to the shift elements in the transmission. The central selector shaft is operated in axial direction and/or along its circumference. In another embodiment of a transmission, at least one selector shaft or sliding selector shaft or several such shafts may be operated in axial direction and/or along their respective circumferences.

For automated operation of transmission-internal shift elements, there may be provided an actuating element or an actuator for activating or controllably executing the activation of transmission-internal shift elements and/or the activation of a torque transmitting system, such as a clutch. The actuator controls, for example, with a drive unit and a subsequent gear the operation of actuating elements, with the actuating elements in turn controlling transmission-internal shift elements.

According to the invention, there exist various stages of integration of an actuator or an actuating element, wherein in a first stage of integration the actuator is located outside the vehicle transmission and at least one selector shaft is activatable through levers, linkages, and/or Bowden cables or cables and/or fluid passageways, such as hydraulic connections. The at least one selector shaft can be a central selector shaft which shifts the gear ratios of the transmission via axial displacement or a rotational motion. There may also be controlled different selector shafts for operating individual selector forks.

In a second stage of integration according to the invention of an actuator or an actuating element, an actuator may be disposed on a transmission in such a way that the actuator receives at least a portion of at least one selector shaft for operating or controlling the at least one selector shaft.

In another stage of integration according to the invention of an actuator of an actuating element, an actuator or an actuating element may be formed in such a way that the selector forks of the transmission are operated directly through mechanical linkages of the actuator, such as through levers, links, shafts, cam mechanisms, etc. Such a stage of integration may be implemented, for example, through a drum with a cam mechanisms, for example a drum controller, which controls the individual shifting forks via cam contours and via the shifting forks engaging with the cam contours, wherein for each shifting fork there is provided, similar to a winding, a cam contour on the circumference of the drum controller, and wherein during rotation of the drum controller, the individual shifting forks are substantially controlled serially.

FIG. 9 shows a gear shifting gate 620 of a 5-gear transmission with reverse gear R, which is characterized by individual shifting channels 621 and a selection path 622 between the shifting channels 621. The final positions 623 in each of the gears 1, 2, 3, 4, 5 R correspond substantially to the positions which a transmission-internal shift element or another actuating element has to assume for engaging the respective gear or the respective gear ratio of the transmission.

In the interval 626, the final positions 623 may vary between a minimum value 624 of a final position and a maximum value 625 of a final position by a permissible tolerance value of the final positions.

These tolerances may, for example, be caused by manufacturing tolerances or other sources within the manufacturing process, so that the final positions of the gear positions are not all exactly identical and do not all correspond to a presettable value.

In addition, transmission-internal shift elements or other elements of the transmission, may change over the life of the transmission or of the actuating element through wear or even malfunction in such a way that the final positions to be controlled change over the life of the transmission.

In automated transmission, the drive torque in the power train is interrupted during shifting of the gears. Consequently, the tractive force is interrupted during each shifting operation. The longer the interruption of the tractive force during a shifting operation, the more uncomfortable the driver feels. In addition, an extended interruption of the drive torque may lead to potentially dangerous situations when operating the vehicle in traffic. The synchronizing operation is the determining quantity for the duration of a shifting operation. Only after the synchronizing operation is terminated can the shifting operation be continued and terminated. If the synchronizing operation is to be terminated faster, then a larger force on the synchronizing ring is essential. The increased force is generated by a larger actuating force. This results in a higher synchronizing torque, which, while speeding up the synchronizing operation, also results in a larger power input on the synchronizing ring, thereby accelerating or enabling wear or even destruction of the synchronizing ring or of another element during the lifetime. For example, wear upon a synchronizing ring may change the final position of a gear to be shifted.

Figure 10:
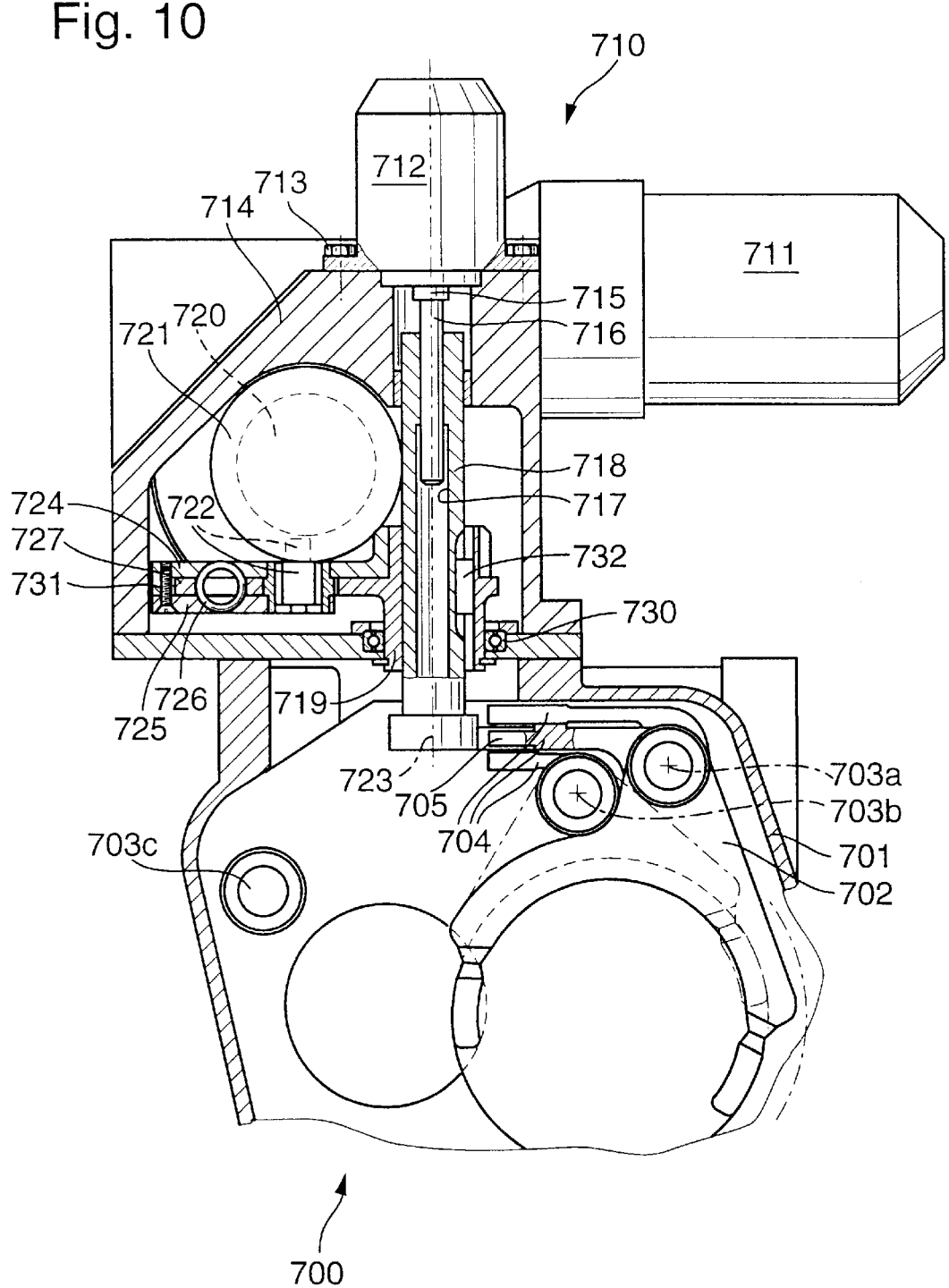
FIG. 10 is a cross-section of a transmission and a further transmission housing.

FIG. 10 shows a transmission 700 with a housing 701 and selector forks 702 which are supported for axial movement by shafts 703a, 703b and 703c. The selector forks have seats or pick-ups 704 for activation, which are activated via a shift finger 705. The individual selector forks 702 are operated by activating the individual seats, whereby the selector forks can be activated to move axially in one or the other direction, as shown in FIG. 8.

The actuating element or actuator 710 for operating or controlling the transmission has a first drive unit 711 and a second drive unit 712, wherein the first drive unit, for example an electric motor, controls the shifting operation and the second drive unit, for example an electric motor, controls the selection operation. Consequently, in this embodiment, each operation is carried out by a discrete drive unit.

The electric motor 712 is secured to the housing 714 of the actuating element 710 through attachment means 713, with a motor drive shaft projecting into the actuator through an opening. A spindle 716 is non-rotatably connected to the motor drive shaft 715. The spindle 716 engages in a bore 717 of the central selector shaft 718. The central selector shaft is supported for axial movement in the seat of element 719, so that as a result of the toothed interlock between the central selector shaft 718 and the spindle 716, the central selector shaft can move axially from side to side when the motor shaft 715 rotates. By the controlled axial movement of the central selector shaft 718, the shift finger 705 is brought into contact with a seat 704 in one of the selector forks 702 for controllably activating one of the selector forks by the shifting operation. Consequently, selecting the selector forks represents a selection operation.

The drive unit 711 drives a drum 720 with cam mechanisms, with the drum rotatable about its axis of rotation. The drum 720 has at least one groove 721 on its outer surface, into which groove at least one follower pin 722 projects. By modulating the position of the groove, the pin 722 can move or rotate relative to the axis 723. The pin 722 is connected to the disks 724 and 725 through a key or a seat. When the discs 724 and 725 move, the torque is transmitted, starting from the discs 724 and 725, to an energy storing device 726 and from the energy storing device 726 to a disc 727. In the region of the element 719, the disc 727 is connected to the central selector shaft 718 through a toothed interlock preventing rotation, wherein the portion or element 719 of the disc 727 is supported on the housing side by the bearing 730, allowing rotation while, however, blocking axial movement. The bearing 730 may be formed as a roller bearing or a friction bearing.

The two disc-shaped elements 724 and 725 are connected to each other substantially non-rotatably, and possibly spaced apart, by way of at least one fastening means, such as a screw 731, rivet and/or snap connection, wherein the disc-shaped element 727 is axially supported or held at least partly between the two discs 724 and 725 for angular movement therebetween. The disc-shaped element 727 is located at least in part between the disks 724 and 725.

The at least one energy storing device 726 is received in seating regions having contact regions, wherein the end faces or end regions of the at least one energy storing device abut these contact regions. The disc 727, for example, has as seating region in the form of a window, wherein the end faces of the window when viewed along the circumference, are provided as contact regions for the end regions of the energy storing device. Upon relative rotation of the elements 724, 725 with respect to element 727, a force is applied to the energy storing device 726, possibly compressing the energy storing device 726. A torque or a force is then transmitted substantially from the parts 724, 725 to the element 727, leading to a controlled rotation of the central selector shaft 718. Through the rotation of the central selector shaft 718, one of the selector forks 702 can be operated or controlled and a gear ratio in the transmission can be engaged or disengaged or shifted.

Between the element 719 and the central selector shaft 718, there may also exist a formfitting connection, which is not direct but which transmits force via another energy storing device 732, such as a spring. In this way, as the result of a rotation of element 719, a force or a torque is transmitted via the energy storing device 732 to the central selector shaft 718, whereby the central selector shaft is rotated.

The drum 720 may also be formed as a radial cam disc operating on both sides, wherein the follower pin 722 can induce the rotation of the central selector shaft by appropriately shaping the curved path of the drum or the cam disc. The cam disc or the drum 720 may be driven by the drive unit 711 by way of a stepped gear, for example a worm gear with worm and worm wheel.

Figure 11:
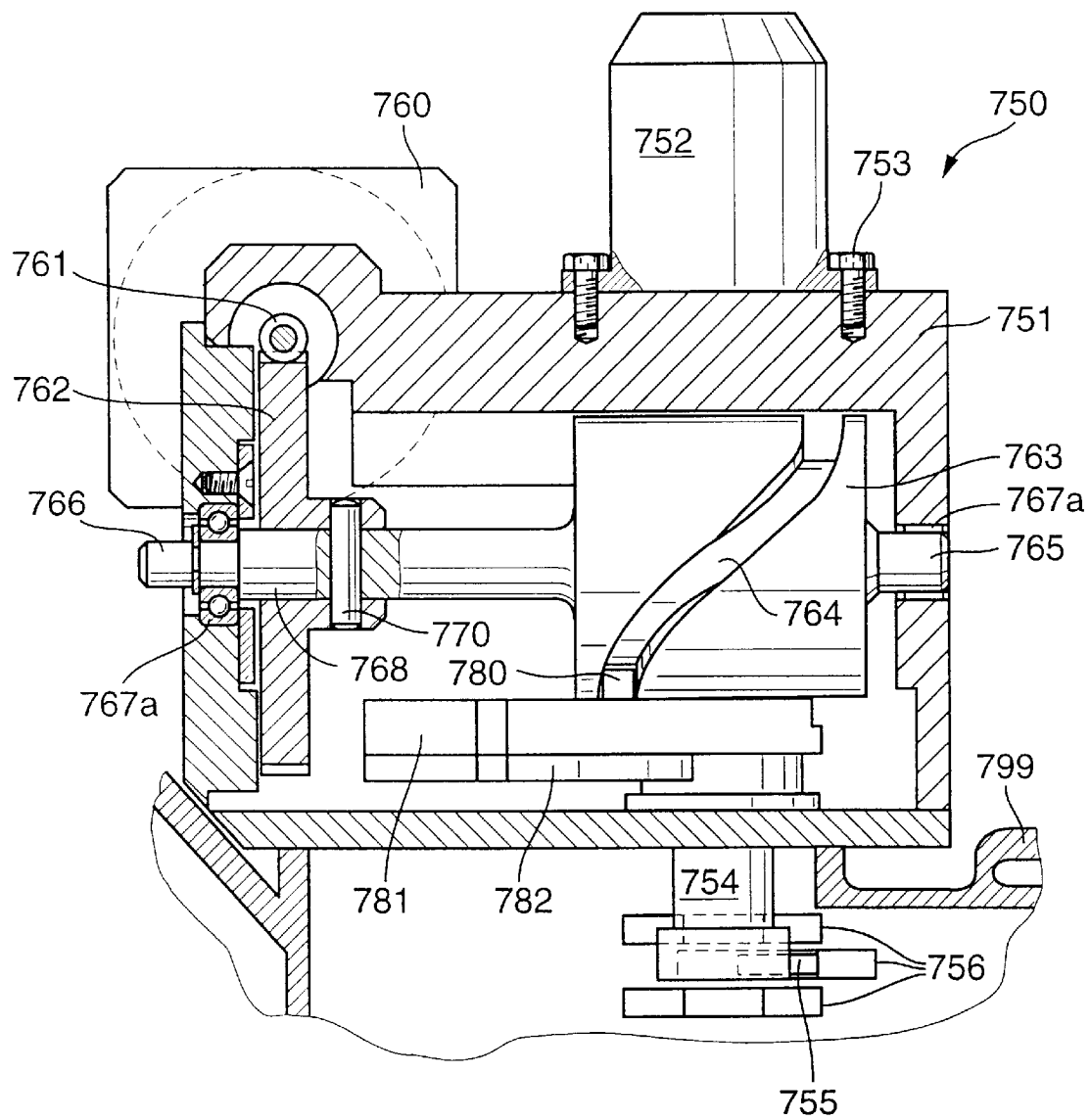
FIG. 11 is a cross-section of an actuating element of the transmission shown in FIG. 10.

FIG. 11 is a view of a modification of the transmission shown in FIG. 10. It comprises an actuating element 750 or an actuator with a housing 751. The housing 751 of the actuator unit 750 is connected to a housing 799 which is not described in greater detail.

The actuating element or actuator 750 includes a first drive unit 752 which is attached to the housing 751 with fastening means 753. The drive unit 752 controls the axial movement or displacement or rotation about an angular pitch of the central selector shaft 754. The drive unit 752 drives the central selector shaft, if necessary via a gear, such as a spingle or an internal thread in an extension of the central selector shaft 754 in a manner as shown in FIG. 10. In the same way, as part of the invention, there may be provided a spur gear or another gear between the drive shaft of the drive unit 752 and the central selector shaft 754 for transforming the drive motion of the drive unit into an actuating motion for the selector shaft.

The end region of the central selector shaft 754 has a finger 755 capable of engaging in one seat in the seating regions 756 of the selector forks. By deliberate engagement of the finger in a selected seat, it is possible to select the respective gears, to control the operation of the selector forks by moving the finger and to engage or disengage a gear ration.

A selection can be made between selector forks by axially displacing the central selector shaft 754 through intentionally controlling its displacement via the drive unit 752.

A second drive unit 760 drives via a gear, for example a worm gear with a worm 761 and a worm wheel 762, a radial cam disc or drum 763 having a groove 764. The drum 763 is supported for rotation in the region 765 and in the region 766 by the bearings 767a. The bearings may be formed as roller bearings or friction bearings. Between the worm wheel 762 and the shaft 768 of the drum 763 there is provided a formfitting connection by way of a pin 770. A pin or bolt 780 which is non-rotatably connected to a disc 781, engages with the groove 764.

Between the disc 781 and a disc 782 there can be disposed an energy storing device adapted for transmitting torque, wherein the energy storing device transmits a torque from disc 781 to disc 782 when the disc 781 is rotated in relation to disc 782. The disc 782 is non-rotatably connected to the central selector shaft 754.

Through the at least one energy storing device disposed in the force or torque transmitting link, i.e. in the operational link for operating the shifting and selection operation, as referenced in FIG. 10 by the numeral 726, the drive unit can continue to operate the actuator after a selector fork has reached a final position in the transmission or at another limit stop, even though the selector fork has reached a stop and can no longer be operated or moved. A force is applied to the energy storing device when a transmission-internal shift element reaches a stop and continues to be driven. By applying force to the energy storing device, the drum 720 or 763 of the actuator can be driven further and reach an final position, before the drive is substantially steered to an constant position and eventually switched off.

If, for example, the drum of the actuator has not yet reached its respective final position after, for example, a selector fork has reached its respective final position, then the force applied to the energy storing device when the drum or the actuating element assumes its respective final position, may cause an insufficient force to be applied to the actuating means or the selector fork, which could cause potential damage.

Such situations can occur frequently during actual operation or when an operation is actuated as a result of existing tolerances, especially when the locations of limit stops are different for different gear positions, while the controlled path for operating the different gear positions is identical.

Figure 12A:
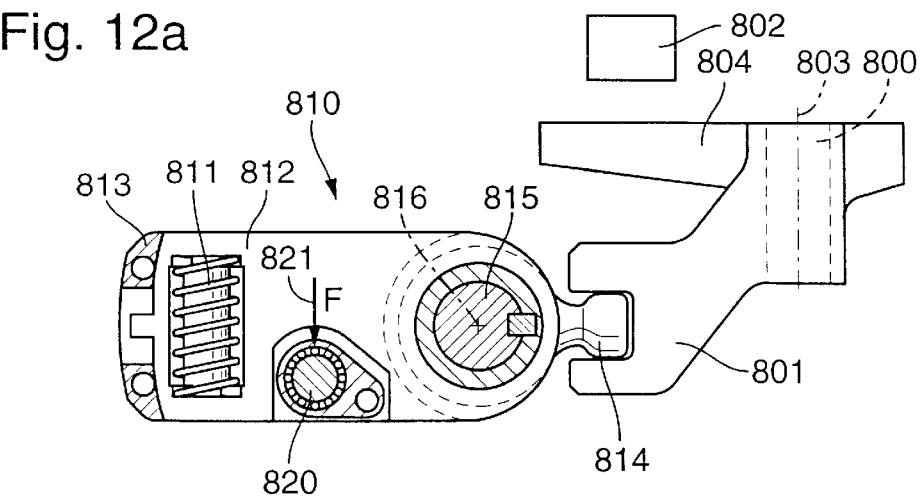
FIGS. 12a–12c are illustrations of the operation of an initially stressed energy storing device in a further transmission.
Figure 12B:
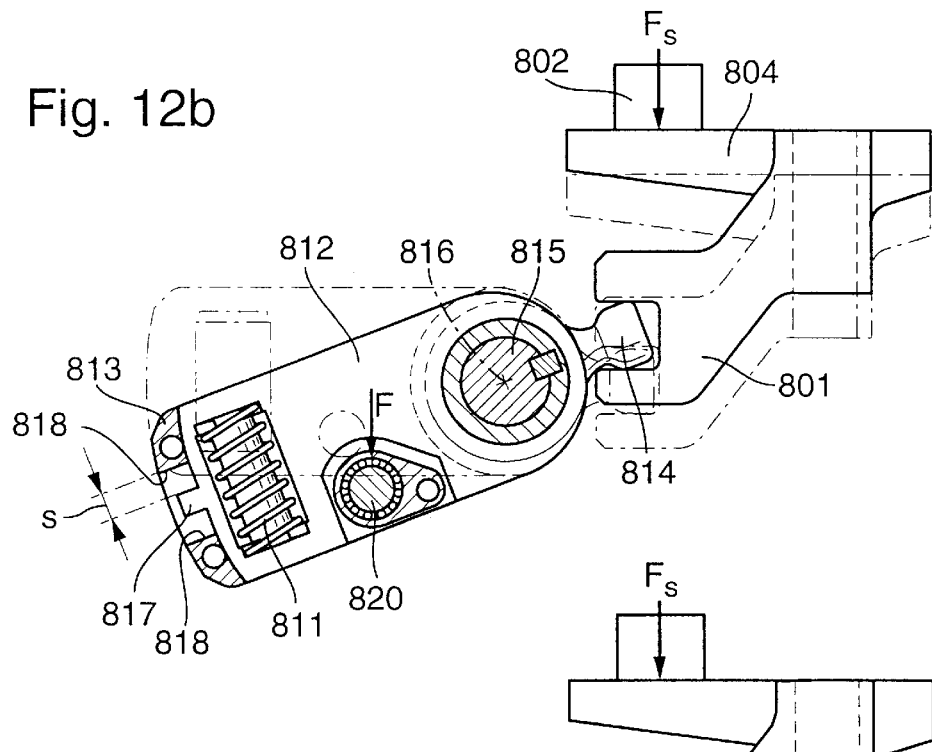
Figure 12C:
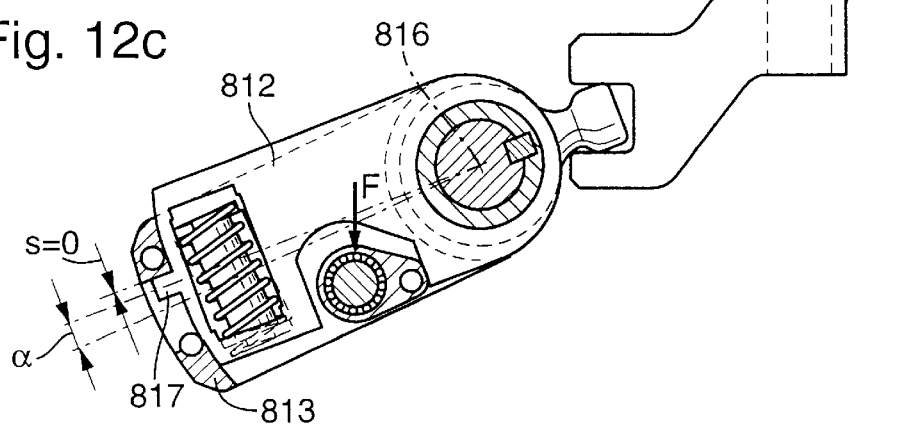

FIGS. 12a to 12c show the operation of an initially stressed energy storing device in the actuating path or the power transmitting path between the actuating element and an operable element, such as a transmission-internal shift element of a transmission or an actuating element of a torque transmitting system.

In FIG. 12a, there is depicted a selector fork 800 with a seating region 801 and a stop 802. The selector fork can be moved axially along the axis 803 up to the point where an element 804 hits the stop 802. At the same time, the selector fork can be operated relative to the axis in the circumferential direction.

For the controlled or regulated actuation of the selector fork 800, there is provided an element consisting of at least two parts, wherein an initially stressed energy storing device 811 is disposed between the at least two parts 812 and 813 in the force or torque transmission path. This at least two-part element 810 for transmitting an actuation can be formed as shown in FIG. 10, wherein the disc-shaped parts 724, 725 are moveable relative to the element 727 only when force is applied to an energy storing device 726.

An actuating finger 814 is non-rotatably connected to the element 812. The non-rotating connection is generally accomplished by a toothed interlock or another formfitting connection or via a one-piece construction, wherein the central selector shaft 815 is non-rotatably connected with the element 812. The finger 814 in turn is preferably non-rotatably connected to the central selector shaft. When the central selector shaft 815 is rotated, the finger 814 rotates about the axis 816.

A finger or pin or bolt 820 is non-rotatably connected to the element 813 and extends into a groove of a drum or of a circular cam disc. If a force F is applied to the finger or pin 820 according to the arrow 821, then the element 813 is rotated in the direction of the force F with respect to the axis of rotation 816. If the force applied to the pin 820 is less than the initial stress of energy storing device 811, then the parts 812, 813 are pivoted about the axis 816 without moving relative to each other, as depicted in FIG. 12b. By pivoting the elements 812, 813 about the axis 816, the central selector shaft rotates about the axis 816, whereby the finger 814 displaces the selector fork 801. When the element 804 hits the stop 802, then there acts a resistance force $F_s$ causing the force F acting on the pin 820 to increase in order to maintain the torque or force equilibrium about the rotation axis 816. The force is here transmitted by the energy storing device 811. If the force applied to the spring or the spring force itself exceeds the initial stress of the energy storing device, then the spring yields or is compressed and the two elements 812 and 813 rotate with respect to each other, as is shown in FIG. 12c. The element 812 remains in its respective position, while the element 813 is rotated further about the axis 816 as a result of the force F.

The angle α characterizes the torsional angle of the element 812 with respect to element 813. The protruding element 817, such as a nose, represents in conjunction with the areas 818 a stop determining the maximum angle α. As a result, there is defined an angle which, after a defined elastic displacement or elastic angle α, prevents the parts 812, 813 from rotating further with respect to each other. The torsional displacement is labeled s; the torsional displacement is a maximal in FIG. 12b, since there is no relative torsion between the elements 812 and 813. The torsional displacement s in FIG. 12c is substantially zero, whereas the torsional angle α assumes a maximum value.

Figure 13A:
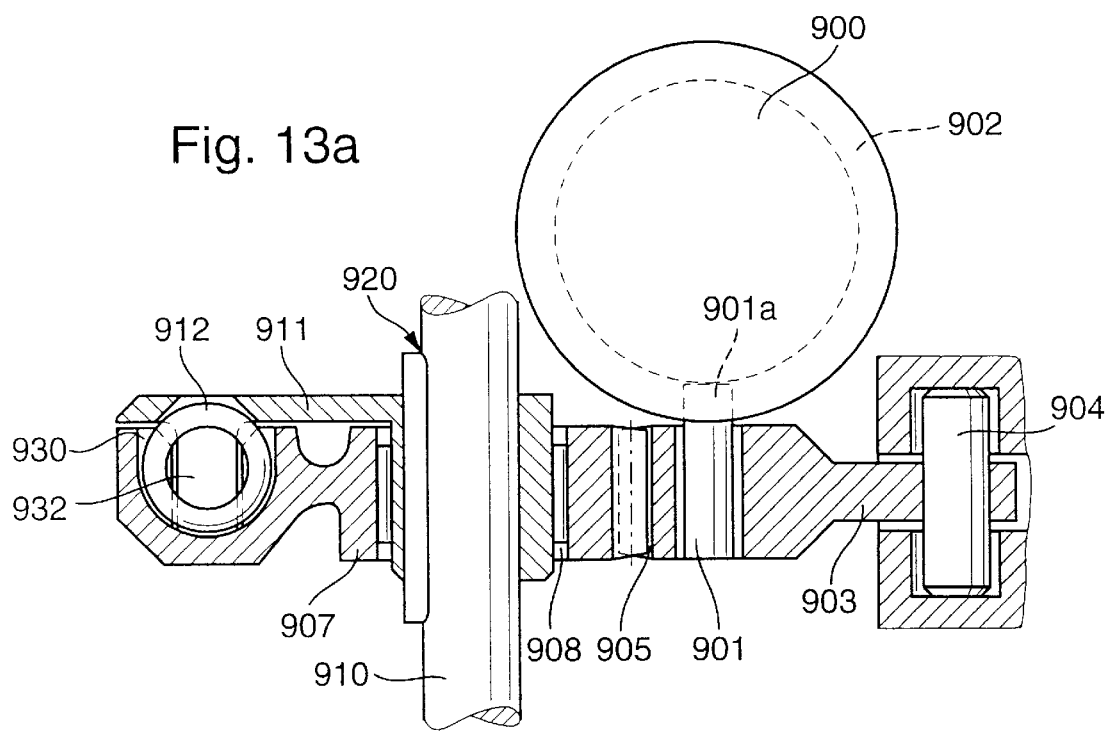
FIGS. 13a–13b are illustrations of another energy storing device.
Figure 13B:
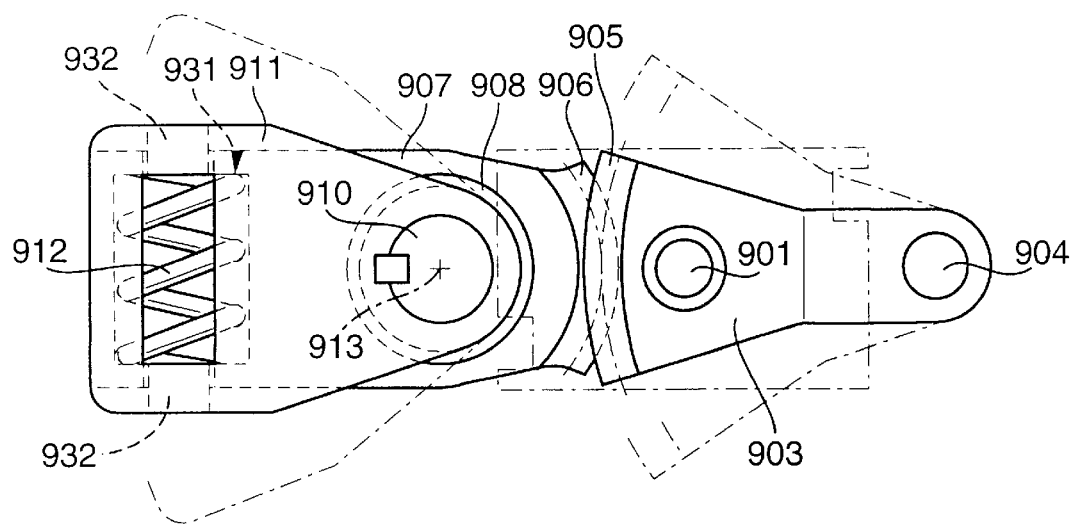

FIGS. 13a and 13b show another embodiment of an energy storing device disposed in the power transmitting path, for example a coil spring or compression spring. The energy storing device may also be formed as a plastic element or as an elastomer element.

Upon rotation, the drum 900 drives with the groove 902 disposed about its outer circumference a pin 901 which at least in a region 901a extends into that groove. The pin 901 is non-rotatably connected with a lever 903, and the lever 903 is pivotally supported by a shaft 904. The lever 903 has teeth 905 which mesh with teeth 906 of element 907. The element 907 has an opening 908 for receiving a central selector shaft 910 or having the latter pass therethrough. The element 907 is connected for force transmission with an element 911 through at least one energy storing device 912 and rotates about the axis 913 of the central selector sh aft 910 by way of the teeth 905, 906 when the lever 903 is rotated.

The energy storing device 912 can be disposed under initial stress in the seating regions, formed as cup-shaped or window-shaped indentations. The seating regions include contact regions where the energy storing device 912 is supported or makes contact. When a coil compression spring is used, preferably the axial end regions of the spring come into contact with the substantially opposite contact regions which may be formed by end regions of the window-shaped indentations.

If the force applied to the energy storing device 912 is smaller than the initial stress force, then the element 911 is rotated substantially in the same direction as the element 907, with the element 911 connected in a formfitting manner with the central selector shaft by way of teeth 920, causing the central selector shaft 910 to rotate. If the force applied to the element 907 in relation to the element 911 is greater than the initial stress force of the energy storing device 912, then the elements 907, 911 are rotated relative to each other.

The actuating motion of pin 901, which is initiated and accomplished by rotating the drum 900, is transmitted from the element 903 to the element 907 via the teeth 905, 906.

The energy storing device 912 is received in a seating region 930 of element 907, and the seating region has a substantially U-shaped cross-section, so that at least half or a portion of the energy storing device with its substantially round or circular contour can be received by this seat. In the axial direction of the energy storing device 912, the seat is bounded by end faces 931. The element 911 includes spaced-apart contact regions 932, and the distance between the contact regions 932 is chosen such that the end turns or convolutions of the energy storing device abut these contact regions 932. The contact regions 932 and the end regions 931 thus bound the space for the energy storing device, with the end turns of the energy storing device abutting these contact regions, preferably initially stressed. The contact regions 932 have tongues and engage at least partially in the U-shaped cross-section of the seating region 930 or bound the latter.

Figure 14:
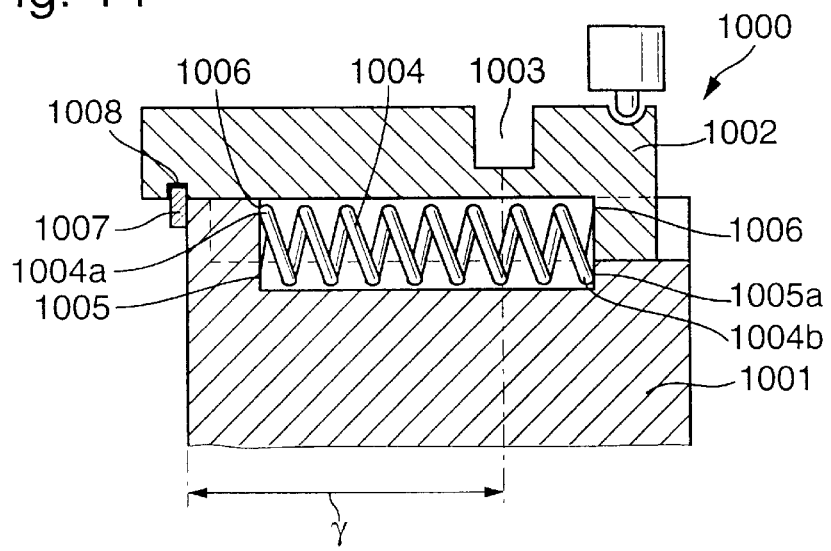
FIG. 14 shows the cylinder of an actuator.

FIG. 14 shows a cylinder 1000 of an actuating apparatus of the invention or of an actuating element of the invention, wherein transmission-internal shift elements, such as selector forks or linkages and the like, are actuated or controlled in response to rotation of the cylinder 1000 which has a groove 1003 in the radially outer marginal elements 1002, like on the cylinder jacket surface. The cylinder 1000 substantially consists of a radially inner cylinder element 1001 and the radially outer cylinder element 1002. The two cylinder elements 1001 and 1002 are substantially non-rotatably connected to each other, for example, via a toothed interlock, wherein the inner toothed interlock of the element 1002 can mesh with the outer toothed interlock of the element 1001. The two elements 1001 and 1002 are, however, axially moveable with respect to each other.

The radially inner cylinder element 1001 is rotated or driven by, for example, an electric motor. As a result of the non-rotatable connection between the elements 1001 and 1002, the radially outer cylinder element 1002 is also rotated or driven. The non-rotatable connection between the elements 1001 and 1002 for preventing rotation can also be employed to provide linear motion, wherein preferably meshed teeth gears, such as keyways, can be used as linear guides and as a preventive measure against rotation or twisting.

The radially outer region of element 1002 has the groove 1003 for engaging a pin, a bolt or a cam, as shown in the previous Figures, wherein the pin can be displaced as a result of a modulation of the axial depth of the groove as a function of the angle of rotation.

Between the elements 1002 and 1001, there is disposed at least one energy storing device 1004 which rotates the two elements at least slightly with respect to each other, when viewed in axial direction. In another embodiment of the invention, the energy storing device disposed between the two elements 1001 and 1002 may also have play.

The end turns or contact convolutions 1004a, 1004b of the at least one energy storing device 1004 are disposed on the radially inward marginal regions 1005 and 1005a located on the radially inner cylinder element 1001 and on the radially outward marginal regions 1006 located on the radially outer cylinder element 1002 and are, if necessary, pre-stressed. The element 1002 is prevented from yielding with respect to the element 1001 by a safety element 1007, such as a locking ring, which engages in or is received by a groove 1008 on the radially outward cylinder element 1002, allowing the energy storing device 1004 to be disposed between these two elements under initial stress. The energy storing device can be disposed, initially stressed, between the elements 1001 and 1002 in such a way that it is subjected to a force or is compressed when the element 1002 is displaced relative to the element 1001. As a result, the drive of the actuator can rotate further, while an axial force builds up via the spring and the pin engaged in the groove 1003 is substantially stationary. In this case, on the one hand, the element 1002 rotates according to the drive movement of the drive and, simultaneously, the element 1002 is displaced axially in such a way that the location where the follower pin extends into the groove 1003 is substantially stationary, although the element 1002 rotates and moves axially.

In an actuator drive of this type, it is advantageous if the elastic means is integrated in the form of an energy storing device or another elastic element. Depicted here is, for example, a cylinder, wherein on the outside or jacket a pin or a roll is guided by a cam contour or groove. This pin or roll operates, for example, via connecting elements, such as a linkage or another connection, and/or a shifting mechanism, such as selector forks. The actuator drive transforms the rotation of the drive into a shifting motion of the transmission-internal shift elements or, for example, of an actuating element of a torque transmitting system, such as a clutch.

Figure 15:
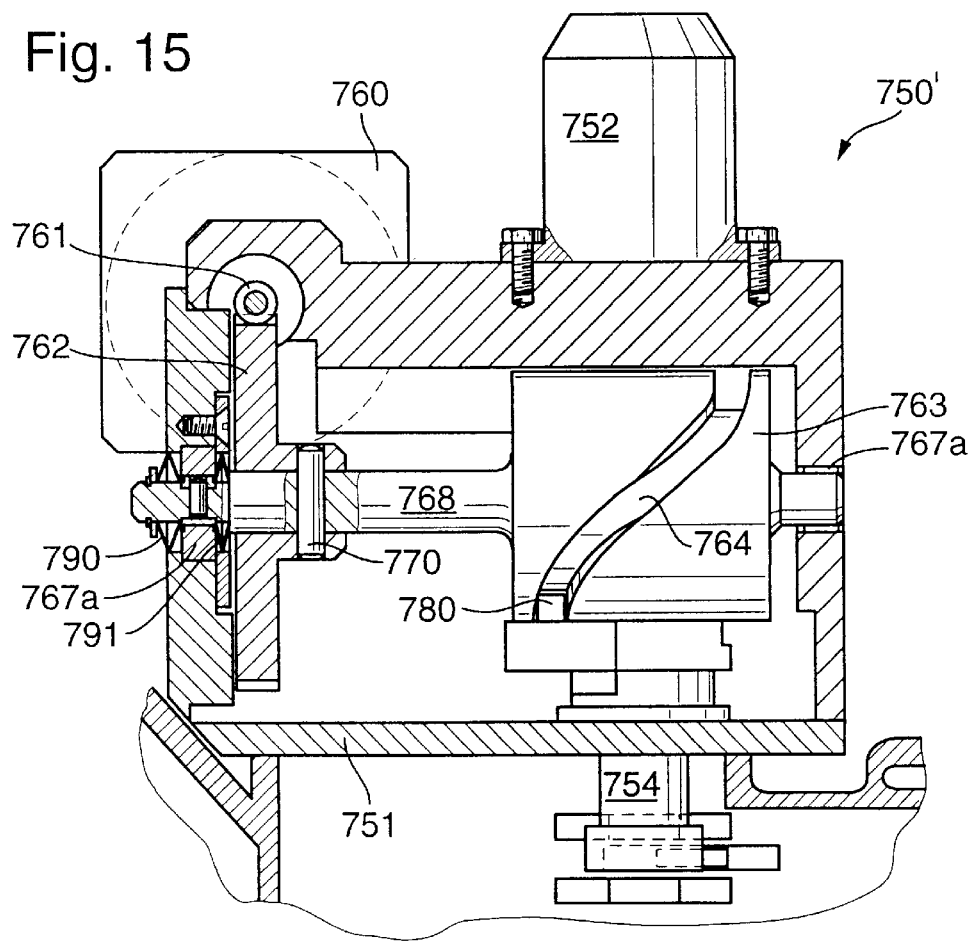
Figure 16A:
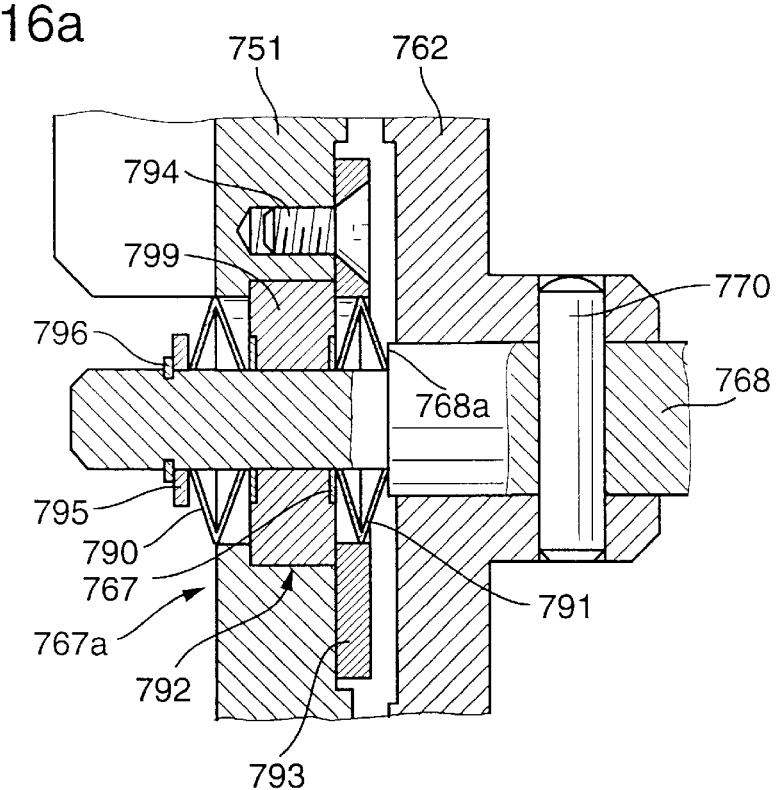

FIG. 15 and FIG. 16a depict an actuator or an actuating element 750' corresponding to the actuator 750 of FIG. 11, with a first drive unit 752 for operating the selection, in particular by an axial displacement of a central selector shaft 754. Aside from that drive, there exists a second drive 760 for controlling the activation of a shifting operation of the transmission via a gear, such as a worm gear with a worm 761 and a worm wheel 762 as well as with a drum or with a cylinder 763 having a groove 764 formed thereon and a pin or roll 780 engaging in that groove.

The worm wheel 762 is supported for rotation by a shaft, such as axle 768, with the shaft rotatably supported by the bearings 767a. The shaft 768 is able to move axially, wherein energy storing devices 790 and 791 are arranged in such a way that the shaft 768 can move relative to the housing 751 only by stressing the energy storing devices.

The shaft 768 and the cylinder 763 non-rotatably connected therewith are supported for rotation in the regions of the bearings 767a. The cylinder 763 with the cam contour or groove 764 form, in conjunction with the pin or roll 780, a cam gear. The shaft 768 and the cylinder 763 are supported axially movably against the resistance of the energy storing devices 790 and 791. The energy storing devices center the cam gear in its axial location if the energy storing devices are initially stressed. When the shifting operation is controllably operated via the actuated or driven cam gear, an axial force component is taken up by the bearings. The drum or cylinder 763 is displaced axially, depending on the spring characteristics of the energy storing devices. As a result, the actuator can rotate further while an axially force builds up via spring 791 or 792.

Figure 16B:
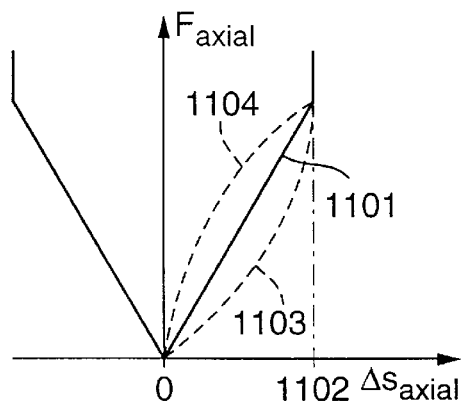
FIGS. 16b–16c are diagrams each showing an axial force $F_{axial}$ as a function of an axial displacement $\Delta s_{axial}$.
Figure 16C:
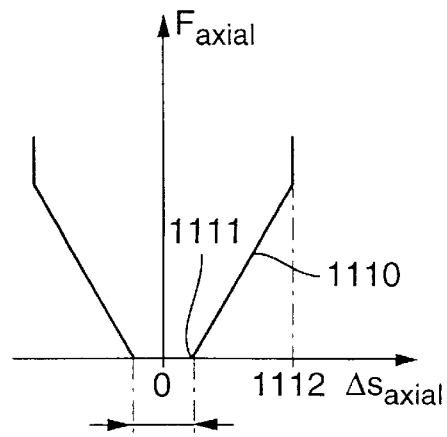

In FIG. 16a there are depicted possibilities for arranging the energy storing devices 790, 791, with the FIGS. 16b, 16c showing diagrams of the forces, such as axial forces, as a function of the axial displacement.

In FIG. 16a, a friction bearing 767a is provided for supporting the shaft 768 and thereby for supporting the worm wheel 762 which is non-rotatably connected to the shaft 768 through the pin 770. The friction bearing 767a substantially consists of a ring-shaped element 799 received by a shoulder 792 on the housing 751 and axially secured by a circular element 793. The element 793 can be formed as a circular disc having several openings, with fastening means 794 extending through such openings for supporting and securing the circular element 793 on the housing 751. The element 793 ensures that the element 799 does not get lost. A roller bearing may also be used.

The energy storing devices are disposed on both sides of the bearing 767a, with the energy storing device 790 disposed between the bearing 767a and a ring-shaped contact element 795 which is axially secured by a locking ring 796. The energy storing device 791 is disposed between the bearing 767a and a projection 768a of the shaft 768. The energy storing devices 790, 791 are supported by the bearing element 799, wherein a pivot bearing 767, for example in form of ring-shaped elements, is disposed in the support regions of the bearing element. The energy storing devices 790, 791 act bilaterally on the shaft 768 and are supported on the housing 751 or on the bearing element by the pivot bearing 767. The ring-shaped elements of the bearing 767 can be formed of metal or plastic. The bearing element 799 can be replaced by a ball bearing. The bearing element 799 can also be rotatably supported in the housing 751.

With the shaft 768 in its rest position, the energy storing devices 790, 791 can be installed without an applied force or initially stressed. The spring characteristics can be linear, progressive or degressive. If the elements 790, 791 are not initially stressed in their respective rest positions, then play can be built in by selecting appropriate dimensions. If the elements 790, 791 are initially stressed in their respective rest positions, then one element is biased when the braking cylinder which is attached to the shaft 768 moves axially, and the other resilient element is relieved. The sum of the two spring forces then results in the displacement-force characteristics shown in FIGS. 16b and 16c.

FIG. 16b shows a diagram wherein the axial force $F_{axial}$ is plotted as a function of the displacement $\Delta s_{axial}$. The axial force $F_{axial}$ is the force acting in an axial direction on the shaft 768 when the shaft is displaced by an amount $s_{axial}$. The curve 1101 is plotted as a linear function, with a linear or progressive 1103 or degressive 1104 increase in force between the origin and a displacement $\Delta s_{axial}$. For $\Delta s>1102$, the curve rises substantially vertically, since after a displacement 1102 a stop is reached and an arbitrarily large force has to be applied for a relative minor displacement.

FIG. 16c shows a diagram wherein the axial force $F_{axial}$ is plotted as a function of the difference in displacement $\Delta s_{axial}$. Evident is play, since the force curve 1110 is different from zero only from displacement 1111 on. The curve also exhibits a quasi vertical increase at the value 1112 indicating that a stop has been reached.

Figure 17A:
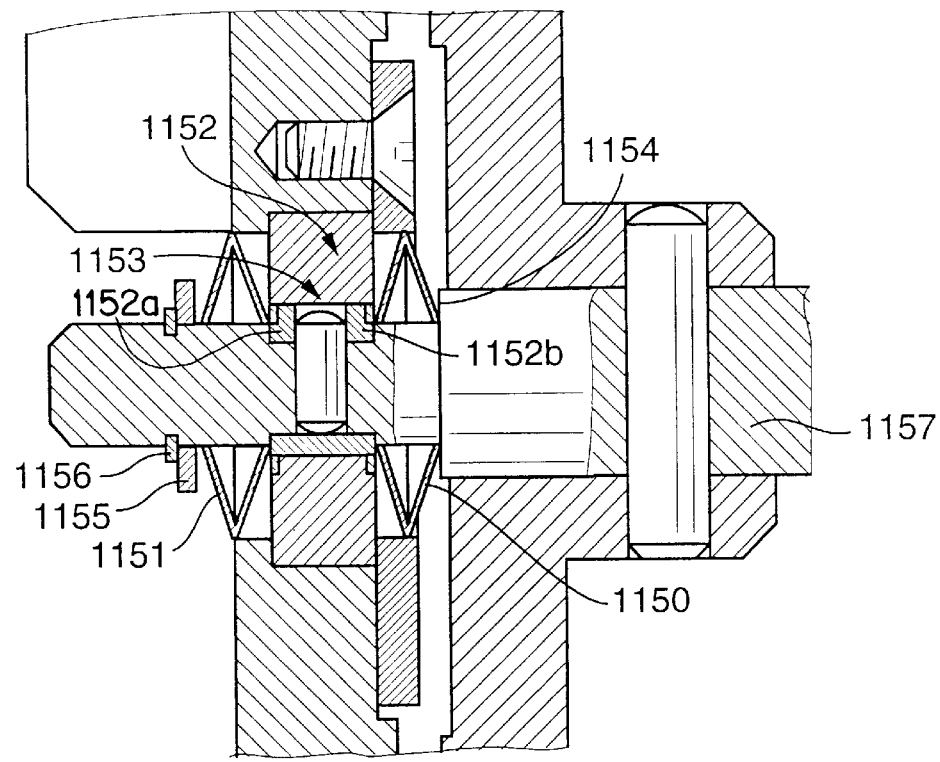
FIG. 17a is a sectional view of prestressed energy storing device.

FIG. 17a depicts an embodiment according to the invention with an arrangement of initially stressed energy storing devices. In contrast to the energy storing devices which are not initially stressed, in this embodiment each spring packet or each spring has limited displacements and is initially stressed inside that displacement. The displacement is limited in this embodiment because of coupling of the energy storing devices 1150, 1151 to a shoulder of a bearing element 1152 including an outer member 1152a and an inner member 1152b. The energy storing devices engage the one or the other of these members depending on the axial position of the shaft 1157. The inner member 1152b and radially outer member 1152a are non-rotatably connected via a keyway, but are free to move axially. The devices 1150, 1151 thus have two contact faces on one side, with only one contact face making contact at any one time depending on the position. On the respective other side, the energy storing device 1150 or 1151 is supported by a projection 1154 of the shaft 1157 or a ring 1155 which latter is secured by a locking element 1156. In their respective rest position, the devices 1150, 1151 may either abut the keyway or the element 1152. If an energy storing device does not abut the element 1152, then there is play between the initially stressed energy storing device and the axially fixed part. If the energy storing devices abut the members 1152a and 1152b, then there is no play, i.e. the system is free from play. If the energy storing devices only abut the axially fixed part, then the play can be negative, i.e. there is overlap. Instead of the keyway interlock, a different interlock with mating teeth or other means for preventing rotation may be employed.

The member 1152a itself can be rotatably supported in the housing or may be a part of a bearing. If the cam gear or the shaft 1157 is moved axially, then the spring packet or the spring is only biased on one side. The other spring packet or the other spring remains in its initially stressed state, since it cannot relax due to the restricted travel.

A radially extending pin 1153 is mounted in the end portion of the shaft 1157 between the members 1152a, 1152b.

Figure 17B:
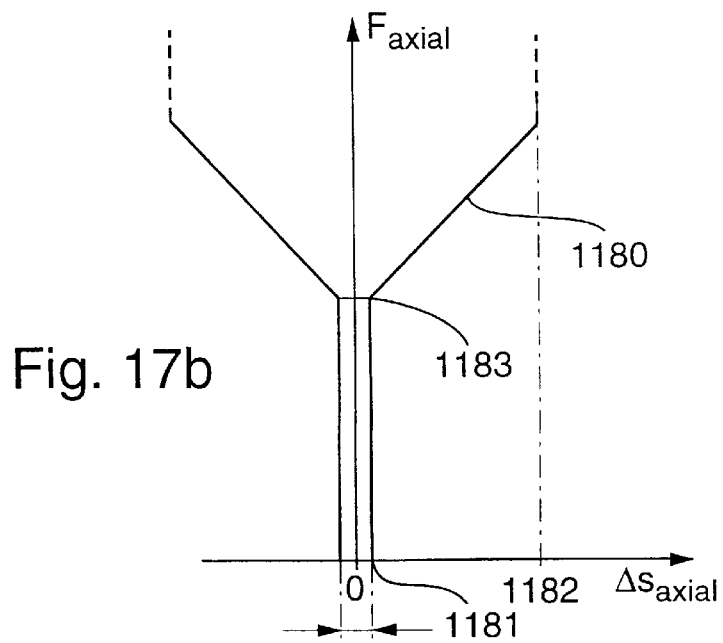
FIG. 17b is a diagram showing axial force $F_{axial}$ as a function of an axial displacement $\Delta s_{axial}$.

FIG. 17b shows a diagram wherein the axial force $F_{axial}$ is plotted as a function of the displacement $\Delta s_{axial}$. The axial force $F_{axial}$ is the force acting in an axial direction on the shaft 1157 when the shaft is displaced by an amount $\Delta s_{axial}$. The curve 1180 is plotted as a function, wherein from the origin to a displacement 1181 play may be present. At the point 1181, the force increases suddenly, reaching a value of 1183. From the displacement 1183 on, the force rises in a linear or a progressive or a degressive fashion. For $\Delta s>1182$, the curve becomes steeper and rises substantially vertically, since after a displacement 1182 a stop is reached and an arbitrarily large force has to be applied for a relatively minor displacement.

Figure 18A:
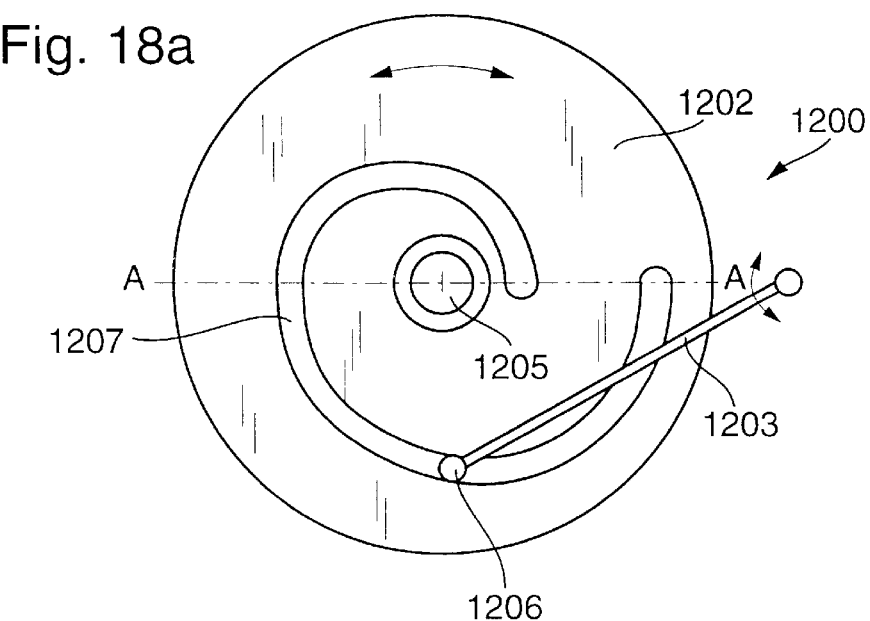
FIG. 18a is an illustration of an embodiment of a subassembly of an actuating element.
Figure 18B:
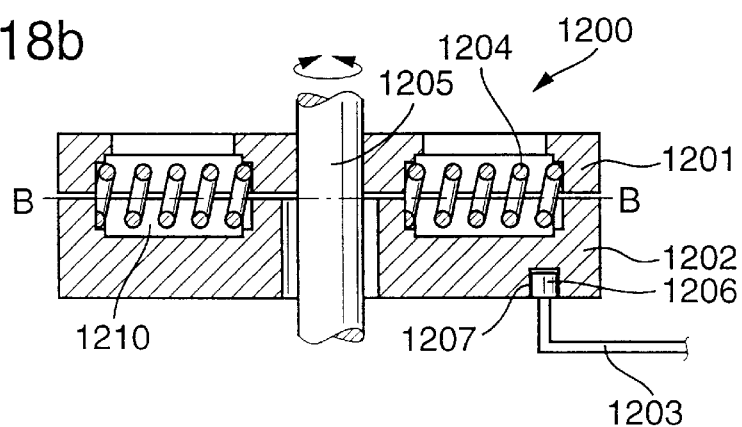
Figure 18C:
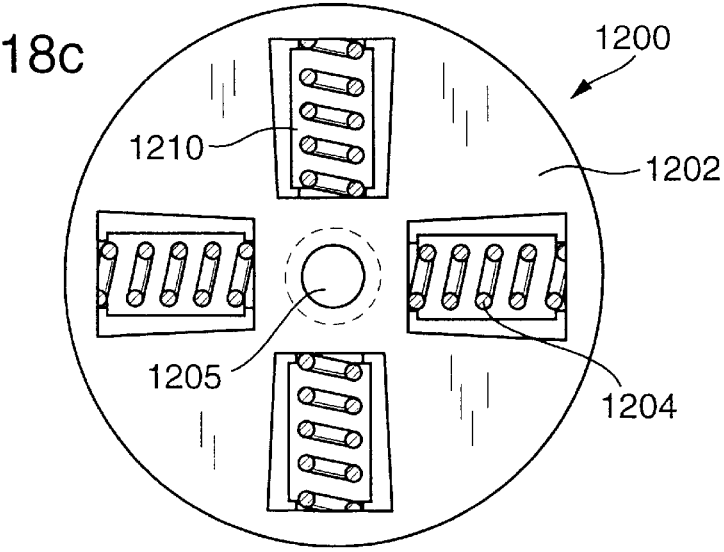
FIG. 18c is a sectional view taken along line B—B in FIG. 18b.

In FIGS. 18a, 18b and 18c, there is depicted an embodiment of a subassembly of a device or of an actuating element 1200 of the invention for activating a shifting and/or selection operation of a transmission and for operating torque transmitting system. FIG. 18a shows a bottom view of the subassembly, FIG. 18b shows a sectional view along the line A—A of FIG. 18a, and FIG. 18c shows a sectional view along the line B—B of FIG. 18b.

FIGS. 18a, 18b and 18c show a subassembly with the drive unit omitted, wherein a planar cam gear is used for controlling an activatable element, for example for a shifting operation or selection. The subassembly basically consists of two substantially coaxial, adjoining disc-shaped elements 1202 and 1202. The disc-shaped element 1201 is connected to a drive unit (not shown) for actuation via the shaft 1205, whereas the disc-shaped element 1202 is supported and guided for rotation with respect to the shaft 1205. The element 1201 is operatively connected to the element 1202 via at least one energy storing device 1204.

The at least one energy storing device 1204 is or, as illustrated, the four energy storing devices 1204 are disposed radially and are received in windows or recesses 1210. The dimensions of the windows are such that the energy storing devices are received in the element 1201 or 1202 so that they at least partly contact the marginal regions of the windows when viewed in radial direction or along the circumference. The energy storing devices contact the other of the elements 1201 and 1202 substantially only in end regions when viewed in radial direction.

The shifting operation can be initiated by the drive in form of a rotation or as a linear motion. The shift force acts by way of a pin or roll 1206 in the groove 1207. The actuatable element is activated via the lever 1203.

A portion of the force acts radially on the element 1201, thereby deforming the energy storing devices 1204 and displacing the center of the element 1202 in relation to its support. The element 1201 and 1202 can thus be rotated further, even if the lever 1203 is not moved further.

This modification is effective during the synchronizing process as well as for adjusting the tolerances of the final positions.

Figure 19:
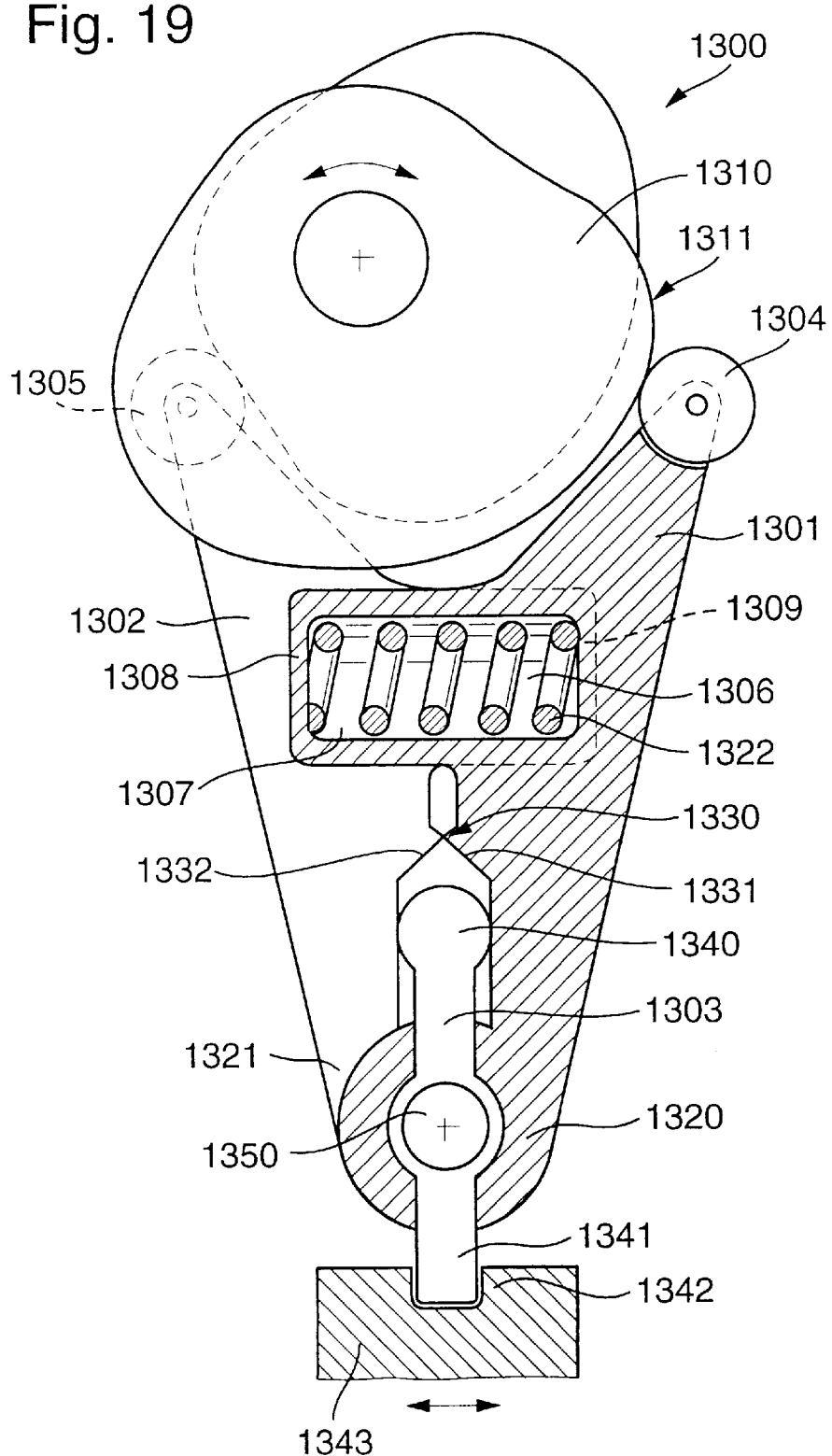
FIG. 19 is a cross section of a cam gear.

FIG. 19 shows an arrangement according to the invention wherein an elastic means is built into the drive of a cam gear 1300. The drive of the cam gear 1300 consists of three moveable elements. These elements are the two lever arms 1301 and 1302 and a lever 1303. In one region, the lever arms 1301 and 1302 have contact regions or seats for rolls 1304, 1305 or sliding blocks for supporting the lever arms 1301 and 1302 on a contour 1311 of a radial cam 1310. The rolls 1304 and 1305 are rotatably supported on the lever arms 1301 and 1302.

The radial cam 1310 is operatively connected to a drive shaft or, for example, an electric motor. The radial cam 1310 has a contour for at least temporarily supporting, for example, the rolls 1304, 1305. The drive motion is basically generated in the device by having the roll or the contact region roll on or be supported by the contour 1311. The lever arm 1301 is rotatably supported in the region 1320. For bilateral operation, the second lever arm 1302 with roll 1305 is supported for rotation about the same pivot point.

Between the two lever arms 1301 and 1302, there is operatively disposed at least one energy storing device 1322. The energy storing device 1322 is received in windows 1307 and 1306 respectively formed in the lever arms 1301 and 1302, with the windows formed by the lever arms themselves and by the fins 1308, 1309. The energy storing device may be provided in the form of an initially stressed energy storing device. The energy storing device may constitute a tension spring or a compression spring. The energy storing device can bias, i.e. twist, the two lever arms 1301 and 1302 with respect to each other.

Between the two lever arms there is also provided a stop 1330 which restricts the respective movement of the two levers towards each other. The stop 1330 is implemented by, for example, projections 1331, 1332 formed on the levers. Through the stop and the energy storing device, the lever arms 1301 and 1302 are compressed up to the stop. The stop can also be formed in a way that play exists between the rolls 1304, 1305 and the cam contour 1311.

The lever 1303 is rotatable, for example, about the axis of the central selector shaft 1350, and has a first finger 1340 and a second finger 1341. The rotational support of lever 1303 may be the same as the rotational axis of lever arms 1301 and 1302. The rotational support of lever 1303 may also be separate from the rotational axis of lever arms 1301 and 1302.

If the lever arm 1301 rotates as a result of the rotation of the radical cam 1310, then the device 132 pulls the lever arm 1302 with it, whereby the finger 1340 engaging between the lever arms rotates. As a result, the finger 1341 which extends into a recess 1342 of an element 1343, also rotates. The element 1343 is thereby operated. The energy storing device 1322 allows the lever arm 1301 to move relative to lever arm 1302. The relative movement or relative rotation is used for preventing damage to a part of the assembly during peak loads or during a drive overrun. Sensitivity to tolerances can also be reduced in this fashion.

Figure 20:
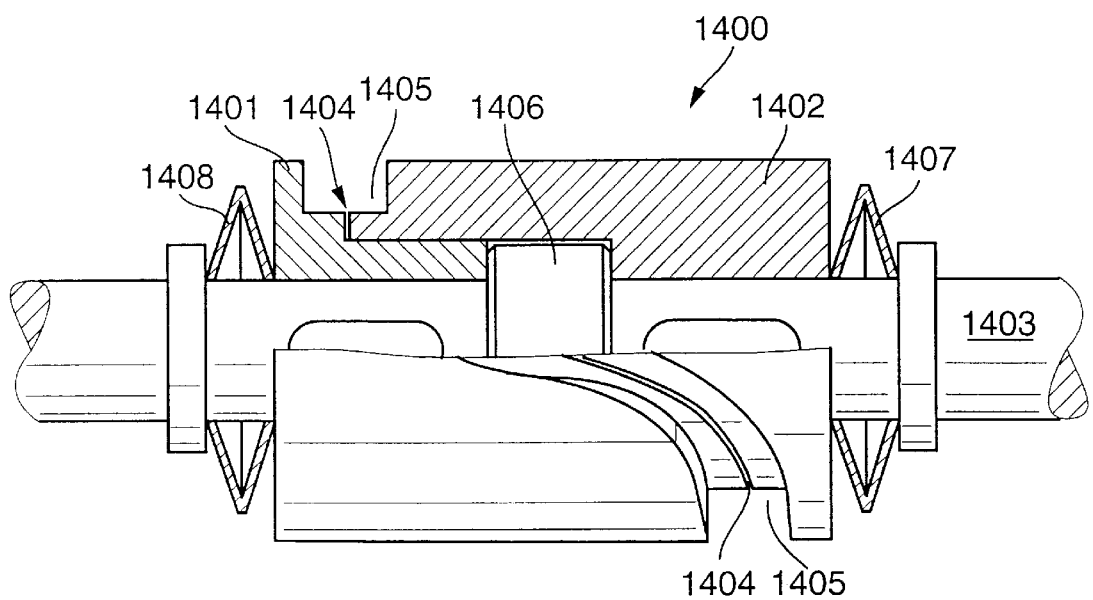
FIG. 20 is a partly elevational and partly sectional view of a drive shaft and a sectional view of two energy storing elements.

FIG. 20 shows another device 1400 of the invention wherein a driven shaft 1403 is capable of driving two elements 1401 and 1402 adapted for axial movement on the shaft, but prevented from rotating with respect to each other. The elements 1401 and 1402 can, for example, be received by a toothed section on the shaft 1403. The device 1400 is provided with a cam gear. The drive of the cam gear is formed by the elements 1401 and 1402 which are carried by the shaft 1403. If the cam gear is symmetric, then the elements 1401 and 1402 can be identical. The parting line 1404 in the region of the cam profile or groove 1405 is preferably located in the region of the groove or of the cam profile effective on both sides.

In the center section of the shaft 1403, there is located a shoulder or cam 1406 which is at least axially connected to the shaft. The elements 1401 and 1402 are supported by this shoulder or are urged against this shoulder by the force supplied by the energy storing devices 1407, 1408. The energy storing device may be initially stressed. Metal springs or elastic elements made of another material can be employed as energy storing devices. Metal springs include disc springs, disc spring packets or compression or tension springs or coil springs.

A follower or a roll preferably tracks in the groove 1405 and is axially displaced by rotating the shaft 1403. If the pin, during actuation, exerts on the lateral wall or on the lateral face of the groove a force which is greater than the initial stress of the energy storing devices, then the respective element 1401 or 1402 is axially displaced. This displacement elastically buffers peak loads and/or cam gear overruns and reduces the tolerances susceptibility of the cam gear. For a symmetrically constructed transmission, manufacturing costs are reduced when the elements 1401 and 1402 are formed identically. These elements can be fabricated form a solid piece, but may also be manufacturable as sheet metal parts by deep-drawing or other metal-forming processes. The drum parts may also be made of a plastic, with the cam profiles having metallic layers.

Figure 21A:
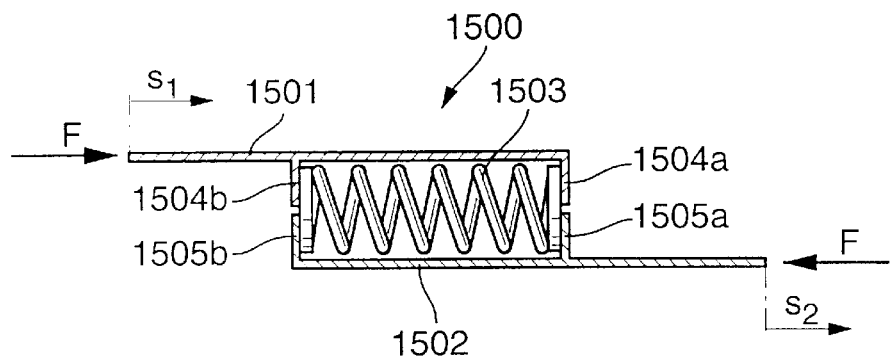
FIG. 21a shows an energy storing device with elastic means.
Figure 21B:
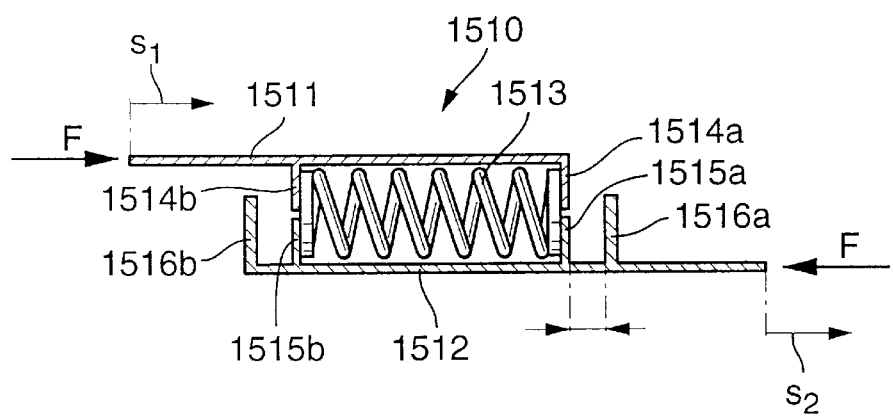
FIG. 21b shows another energy storing device with elastic means.
Figure 21C:
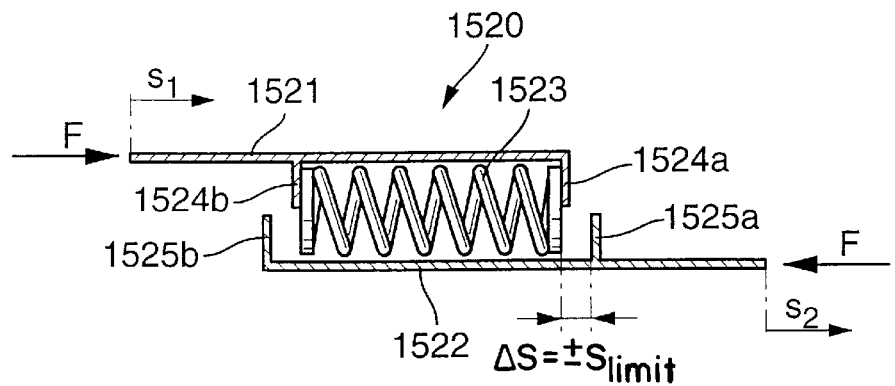
FIG. 21c shows a further energy storing device with elastic means.

FIGS. 21a, 21b and 21c schematically depict arrangements 1500, 1510 and 1520 of energy storing devices 1503, 1513 and 1523 in the actuating path, for example in the shift or selection path.

In FIG. 21a, there is shown an element 1501 on the drive end operatively connected to an element 1502 on the drive end via the energy storing device 1503. A force F is acting on the element 1501 on the drive end. The path $s_1$ is determined by an actuator, the path $s_2$ depends on the load upon the system. The energy storing device 1503 is effective between the elements 1501 and 1502 and is received in seats. The seats are formed by the regions 1504a, 1504b on the element 1501 and by the regions 1505a, 1505b on the element 1502. The energy storing device 1503 is preferably installed under initial stress in the seats of both elements 1501 and 1502.

Figure 22A:
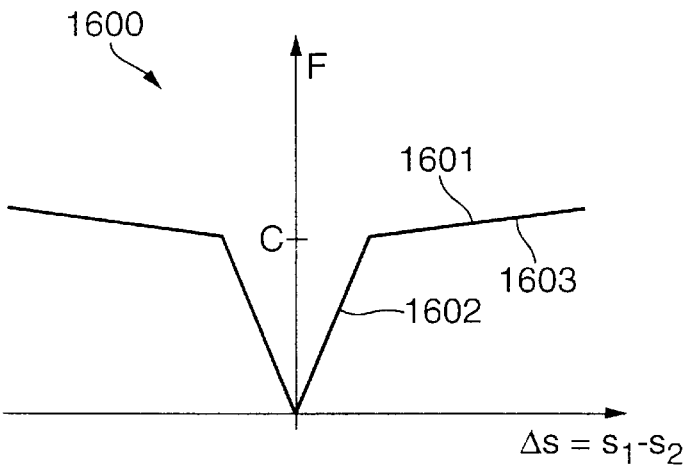
FIGS. 22a–22c are diagrams showing characteristic curves of a force as a function of a path difference $\Delta s = s_1 - s_2$.
Figure 22B:
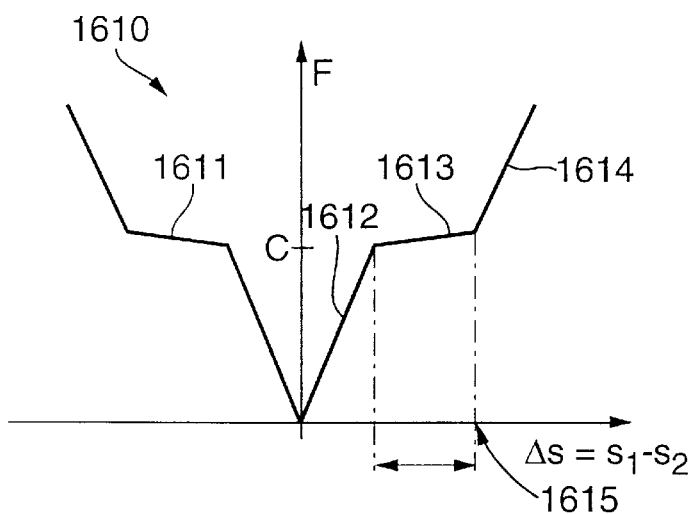
Figure 22C:
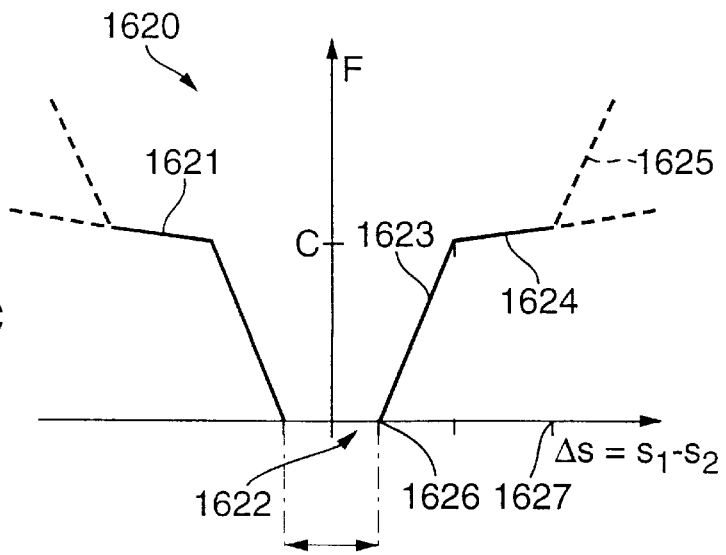

FIGS. 22a, 22b and 22c show diagrams 1600, 1610 and 1620 with characteristic curves 1601, 1611 and 1621 of the force, such as the shifting force, as a function of the path difference $\Delta s = s_1 - s_2$.

The characteristic curve 1601 is subdivided into two path difference regions $\Delta s$ 1602 and 1603. In region 1602, the force F increases linearly up to the value C of the initial stress force. Up to this force C, only the elastic means of the shifting mechanism is effective. From force C on, the energy storing device reacts and the force operating on the energy storing device is larger than the initial stress force C. From this force on, the elastic means of the shifting mechanism is connected in series with the energy storing device 1503. This is the reason for the flatter dependence of curve 1601 in the region 1603.

In FIG. 21b, there is shown an element 1511 on the drive end operatively connected to an element 1512 on the drive end via the energy storing device 1513. A force F is acting on the element 1511 on the drive end. The path $s_1$ is traveled by the actuator, the path $s_2$ depends on the load upon the system. The energy storing device 1513 is effective between the elements 1511 and 1512 and is received in seats. The seats are formed by regions 1514a, 1514b on the element 1511 and by regions 1515a, 1515b on the element 1502. The energy storing device 1513 is preferably received in the seats of both elements 1501 and 1502 under initial stress. In addition, the elements 1511 and 1512 have stops 1516a and 1516b which can make active contact with the regions 1514a and 1514b. These stops restrict the relative displacement of the elements 1511 and 1512 to a difference path value of $\pm s_{limit}$. The dimensions of the stop 1516a are such that the element 1511 hits this stop after the preset spring displacement $\Delta s = \pm s_{limit}$.

The characteristic curve 1611 of FIG. 22b is subdivided into three path difference regions $\Delta s$, 1612, 1613 and 1614.

In region 1612, the force F increases linearly up to the value C of the initial stress force. Up to this value C, only the elastic means of the shifting mechanism is effective. From value C on, the energy storing device 1513 reacts and the force acting on this energy storing device is larger than the initial value C. From this force on, the elastic means of the shifting mechanism, for example the shifting mechanism, is connected in series with the energy storing device 1513. This is the reason for the flatness of the curve 1611 in the region 1613. At the displacement Δs=1615 the region 1514*a* or 1514*b* hits the stop 1516*a* and substantially blocks further biasing of the energy storing device 1513. From the displacement 1615 on, only the elastic means of the actuating mechanism is again effective. This elastic means may be formed as an additional elastic means or as a presettable elastic means of the mechanism, such as a linkage.

Employing the stop can be advantageous if a larger shifting force is desirable. It may also be advantageous if the actuator reaches its respective controlled final position before the operated element does reach its respective final position. It may, for example, happen in the absence of a stop that the actuator has traveled the entire preset displacement path indicating the end of the shifting operation, while a shift element is still synchronizing. Reference is made here to the FIGS. 24*a*, 24*b* and 24*c*.

In FIG. 21*c*, there is shown an element 1521 at the drive end operatively connected to an element 1522 at the driven end via the energy storing device 1523. A force F is acting on the element 1521 at the drive end. The path $s_1$ is traveled by the actuator, the path $s_2$ depends on the load on the system. The energy storing device 1523 is effective between the elements 1521 and 1522 and is received in seats. The seats are formed by the regions 1524*a*, 1524*b* on the element 1521 and by the regions 1525*a*, 1525*b* on the element 1502. The energy storing device 1523 is preferably under initial stress when supported in the seat of the element 1521. The seat 1525*a*, 1525*b* receives the energy storing device 1523 with play.

The characteristic curve 1621 in the diagram 1620 of FIG. 22*c* is subdivided into three path difference regions Δs 1622, 1623 and 1624. In region 1622 there is no force applied as a function of the displacement since the energy storing device 1523 is received with play. From the point 1626 on, the force F increases substantially linearly up to the value C of the initial stress force. Up to this value C, only the elastic means of the shifting mechanism is effective. From the value C on, the energy storing device 1523 reacts and the force operating on the device 1523 is larger than the initial force C. From this force on, the elastic means of the operating mechanism, for example the shifting mechanism, is connected in series with the energy storing device 1523. This is the reason for the reduced slope of the curve 1621 in the region 1624. At the displacement Δs=1627 the region 1524*a* or 1524*b* can hit a stop and can substantially block further biasing of the spring. From the displacement 1627 on, only the elastic means of the actuating mechanism is again effective (see the curve region 1625). This elastic means may be formed as an additional elastic means or as a presettable elastic means of the mechanism, such as a linkage.

Figure 23:
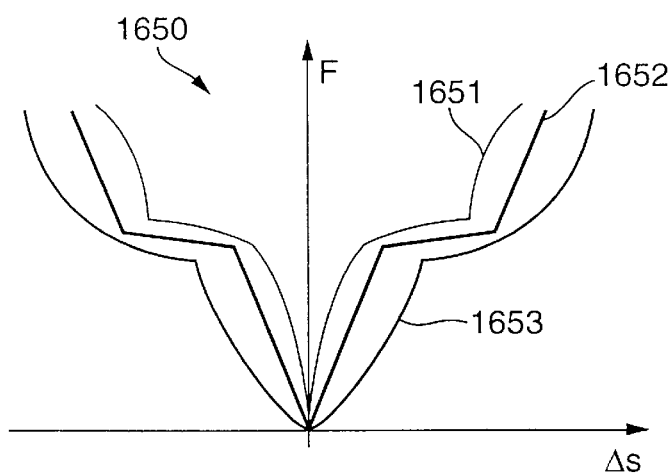
FIG. 23 is a diagram showing different characteristic curves of a force as a function of a path difference $\Delta s = s_1 - s_2$.

FIG. 23 shows a diagram 1650 with possible shapes of characteristic curves, with curve 1651 exhibiting degressive behavior, the curve 1652 an substantially linear behavior and the curve 1653 a progressive behavior. The degressive and progressive dependence of the characteristic curves can also occur with the curves described above or with the curves described hereinafter, which are shown as linear functions.

Figure 24:
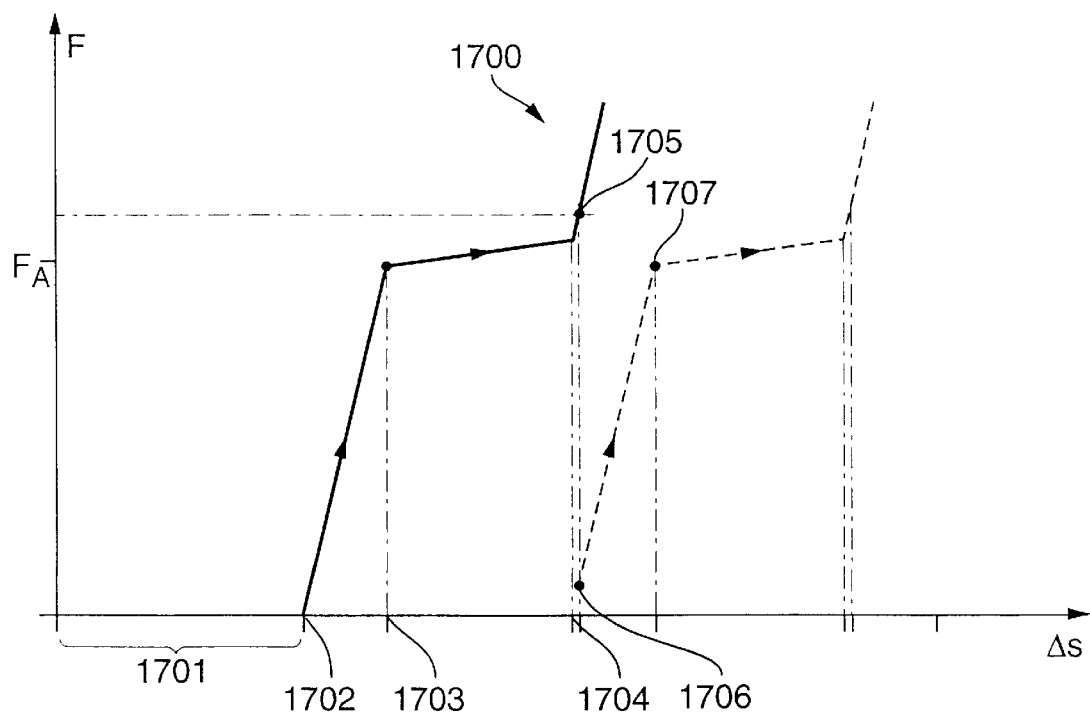
FIG. 24 is a diagram showing a force as a function of a path difference $\Delta s = s_1 - s_2$ of an initially stressed spring with a limit stop.

FIG. 24 depicts in form of a diagram 1700 the application of an initially stressed spring with a stop, for example according to FIGS. 22*a*, 22*b* and 22*c*. The transmission is activated by a shifting operation. During the synchronization step of a transmission in a shifting operation, the actuator can continue its movement due to the elasticities, although the transmission-internal shift element is still stopped at the synchronization, since the gear is not yet fully synchronized, and is not displaced further. At the beginning of the shifting operation (see 1701), the play Δs is overcome. During further actuation, the force F increases according to the elastic means of or in the shift connection, such as a linkage. The increase in force from point 1702 on thus occurs according to the elastic means of a linkage. The initially stressed energy storing device is basically not compressed yet. At a path difference Δs 1703, for example at the force $F_A$, the initial stress of the energy storing device is reached and the energy storing device is compressed during further actuation, accompanied by an increase in force. If the drive is blocked from moving, the actuator may still be able to cover a certain distance. This additional compression may take place to possibly the distance 1704 or 1705. At 1704, the characteristic curve again rises steeply, since at this difference displacement a stop is hit and the system is again governed by the elastic means in the linkage. AT 1704 or 1705, the system reaches the maximum force of the actuator, whereby the actuator is decelerated or stopped. When the synchronization process is terminated and the gear is synchronized, then the operating force decreases from the point 1705 to the point 1706. If the drive is again blocked during another shifting operation, for example when gear pairs meet each other point-to-point, then the force increases again from point 1706 to point 1707. This further increase can be detected as a second increase, if a sensor detects the force or the displacement during a shifting operation. The first increase of the force is caused by synchronization essential for each shifting operation. The second increase can be caused by an unfavorable process or procedure which can be prevented or lessened by an appropriate control operation.

Figure 25:
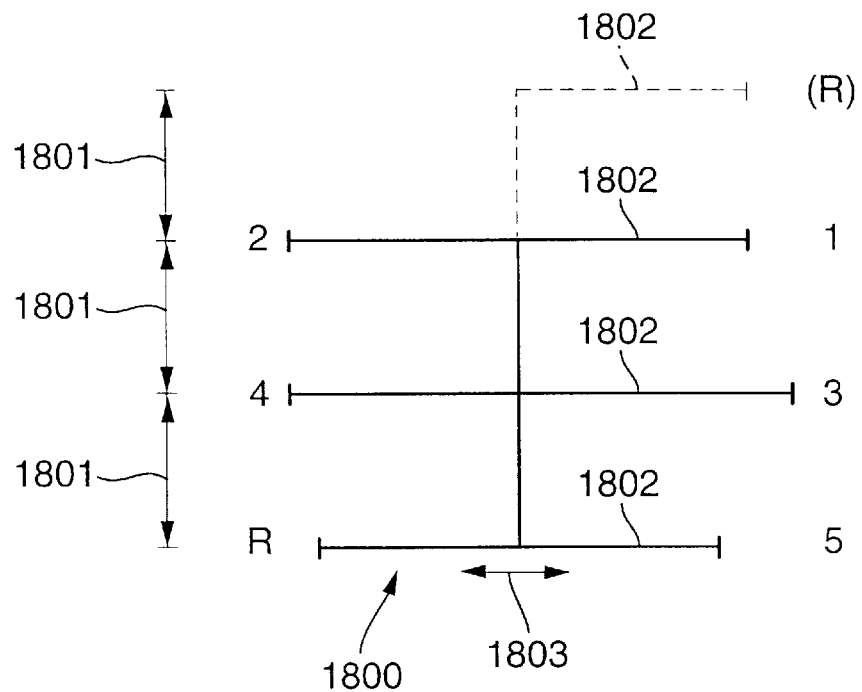
FIG. 25 is a schematic depiction of a gear shifting gate of a transmission.

In FIG. 25, there is shown schematically a gear shifting gate 1800 of a transmission, which can be operated directly by an actuating element or indirectly via linkages. Actuation is effected along the selection paths 1801 (i.e., up and down as view in FIG. 25) and/or along the shift paths 1802 (see the arrow 1803).

During a shifting operation, for example from second gear into third gear, i.e. from an engaged gear position, shifting first occurs along one shift path or channel 1802 until the neutral position is reached; subsequently, another shift channel 1802 is selected along a selection path 1801, whereafter the third gear is engaged in the respective channel 1802.

In certain transmissions, a selection operation within a selection channel or a selection path can generally only be executed, if the transmission-internal shift element is operated or moved at least partly from an engaged position towards the neutral position. In other transmissions, a selection can in principle only be made after the neutral position has been reached. Such restriction again initiating or executing a selection before a shifting operation has at least partly been executed in a shift channel and can lead to time delays and consequently prolong the selection operation.

A shifting operation can be executed in accordance with the following method. The actuator or the motor of the actuator for controlling the shifting operation, like shifting actuator, is accelerated and operates the transmission-internal shift element for disengaging the gear in the shift channel. Substantially before and in the neutral position, the shifting actuator has to be decelerated and has to be stopped or slowed down in the neutral position. In this position, the actuator or the motor of the actuator for controlling the selection operation, like selection actuator, can be accelerated for operating the transmission-internal shift element from one shifting channel into another shifting channel. The selection actuator subsequently has to be decelerated in or before the position of alignment with a new shifting channel, so that the transmission-internal shift element is located at the new shifting channel. Subsequently, the selected gear is engaged through acceleration and deceleration the shifting actuator. The acceleration and deceleration phases can cause the shifting operation to be rather time-consuming. By taking advantage of play and elasticities, a temporary overlap of shifting and selection operations can be advantageously utilized within the operating characteristics of the transmission.

It is advantageous if an elastic means, either an initially stressed or an initially unstressed elastic means, is disposed in the operating path or in the power transmitting path of the selection operation or the selection actuator. In this way, the selection actuator can be activated or be made activable, before the shifting actuator has moved transmission-internal shift element substantially into the neutral position.

Figure 26A:
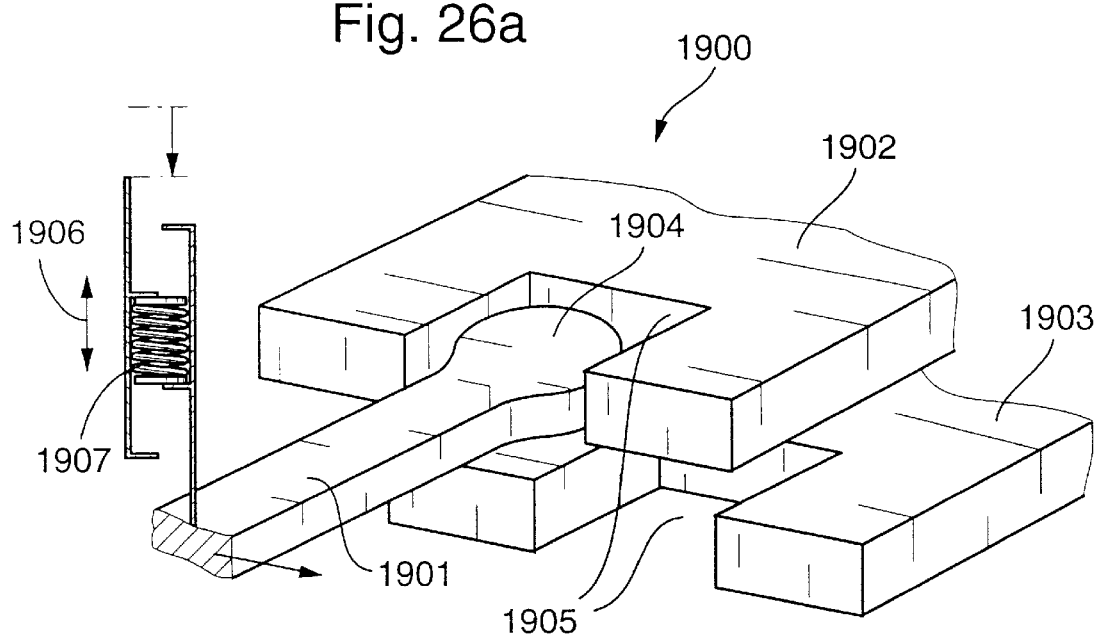
FIGS. 26a–26b are schematic perspective views of the selection process.
Figure 26B:
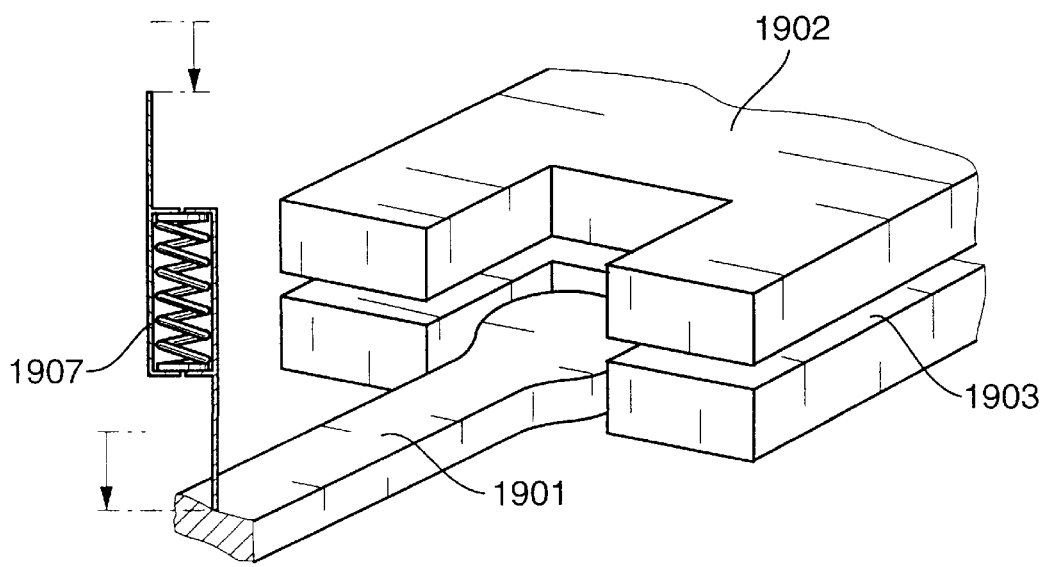

FIGS. 26a and 26b schematically depict these processes during a selection operation. There is shown a finger 1901 of a central selector shaft (not shown) in a transmission 1900. The finger 1901, when displaced, activates elements of selector forks 1902 and 1903, with only two of these elements shown in FIGS. 26a, 26b. The finger 1901 engages with one end portion 1904 in a seating region 1905 of the element 1902 and/or 1903. Element 1902 or 1903 is selected by controlling the axial position of the finger 1901, wherein the position can be changed in directions indicated by the arrow 1906 by way of a selection actuator. The shifting operation is accomplished by rotating the central selector shaft, with the rotation taking place substantially about the axis of the central selector shaft, or approximately about the axis parallel to the arrow 1906. Hereby, the finger 1901 is moved with its end portion 1904 and at least one element 1902, 1903 is displaced.

In FIG. 26a, a gear is engaged which is evident from the fact that the two fingers 1902 and 1903 are not directly superposed, but are displaced relative to each other. The finger 1901 engages with its end portion 1904 the seating region 1905 of the element 1902. The displacement of finger 1901 causes a displacement of element 1902. The respective gear has been shifted.

The intent is now to shift with a controlled process from this gear position into a new gear. For this purpose, the shifting actuator is activated for guiding the shift finger 1901 into the neutral position. Furthermore, the selection actuator is activated for operating the central selector shaft substantially in such a way that an energy storing device 1907 is deformed until that the selector shaft is located substantially in the selected shifting channel whereby the energy storing device is no longer stressed. The energy storing device 1907 is stressed by causing the central selector shaft to assume a central position which is displaced by a distance $s_{actuator}$. When the energy storing device 1907 is not stressed, the shift finger 1901 is displaced by the amount $s_{actuator}$ in the axial direction. It follows: $s_{actuator} = s_{shift-finger}$.

Since the shift finger 1901 is not yet in the neutral position, the central selector shaft, as a result of the displacement of element 1902, is able to engage in the pick-up 1905 of element 1903. Shifting in the neutral position is thus accomplished with the energy storing device 1907 initially stressed, until the neutral position has substantially been reached. In the neutral position, the energy storing device 1907 relaxes at least as far as determined by a stop which prevents further relaxation. As a result of such relaxation of the device 1907, the finger 1901 is operationally moved into the preset position of the selected shifting channel, as is shown in FIG. 26b.

The finger 1901 snaps into the preset position of the selected shifting channel, whereby the subsequent shifting operation along or in the selected shifting channel can be initiated or executed.

Figure 27:
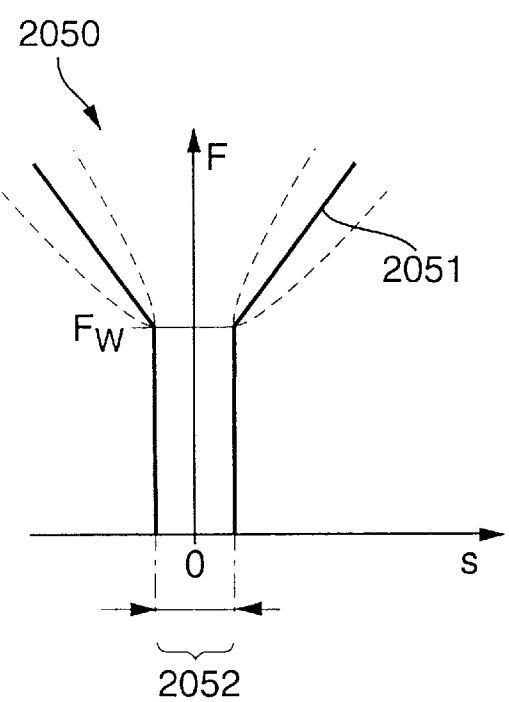
FIG. 27 is a diagram showing a characteristic curve of a prestressed energy storing device.

FIG. 27 shows a diagram 2050 with a characteristic curve 2051 of an initially stressed energy storing device 1907, with the force plotted as a function of the selected path. The energy storing device can be initially stressed in such a way that an initial stress $F_v$ as well as a play 2052 is provided. When the play 2052 is overcome, the characteristic curve can be linear, progressive or degressive.

Figure 28:
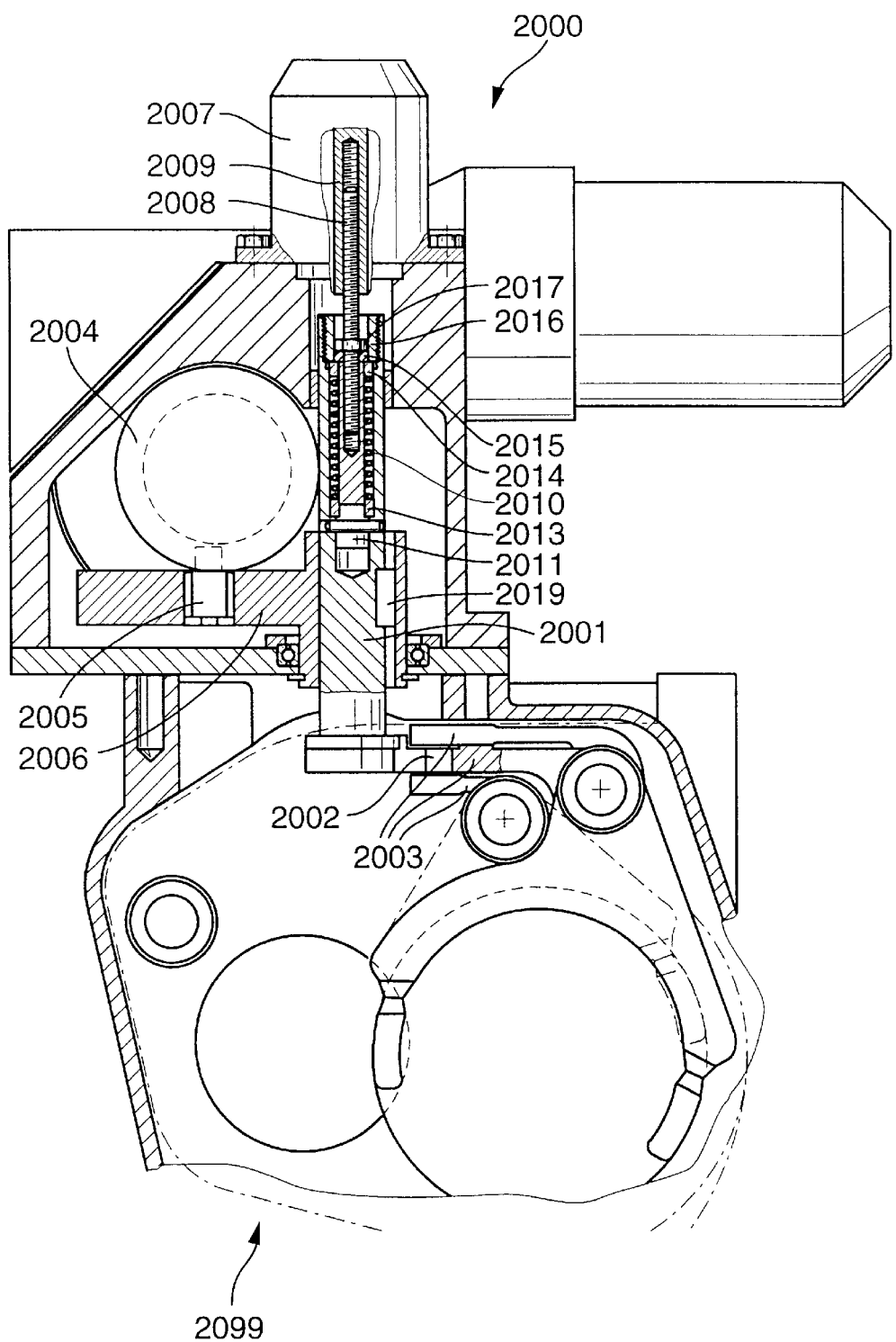
FIG. 28 shows an actuating element of a transmission.
Figure 29:
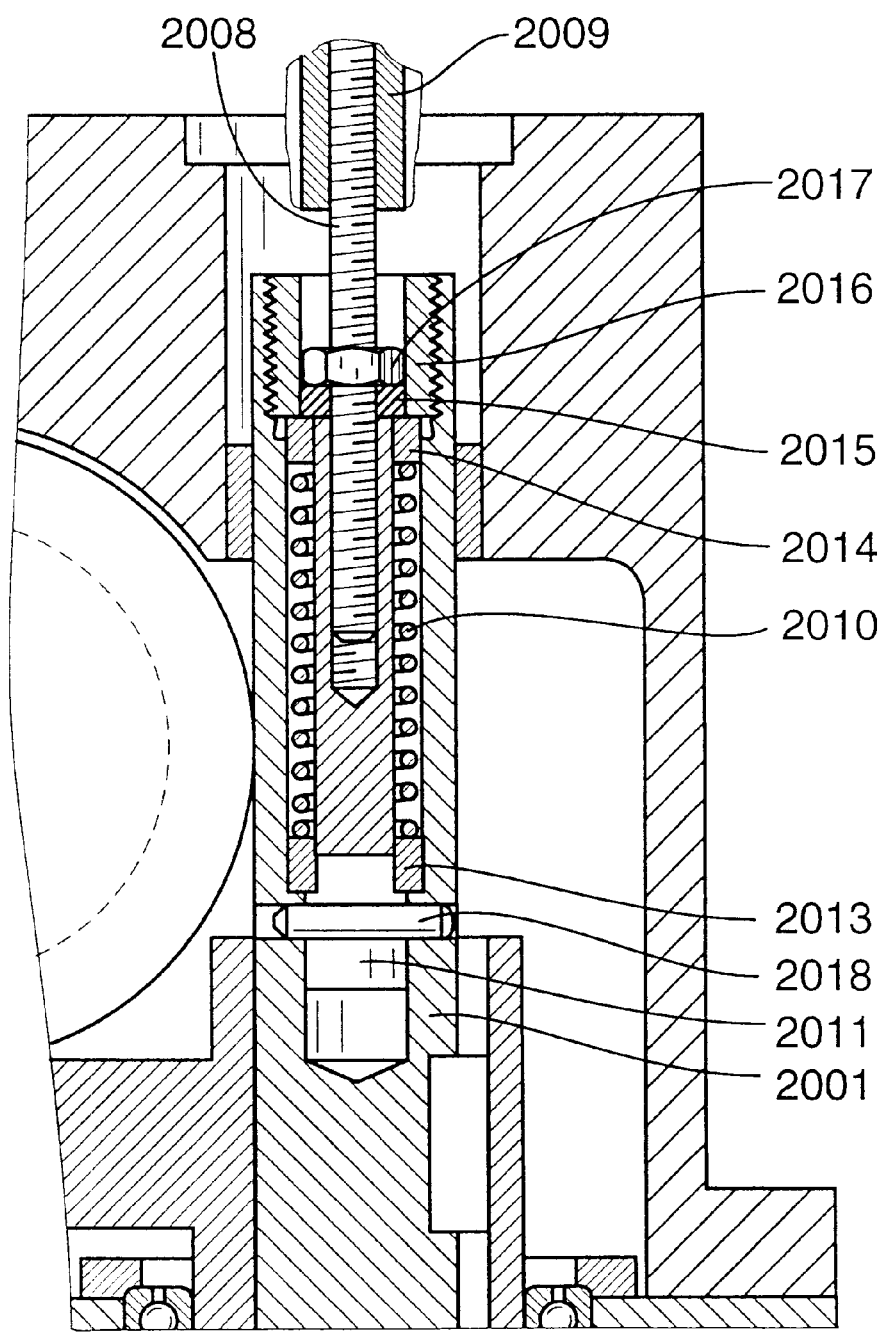
FIG. 29 is an enlarged view of a detail in FIG. 28.

FIGS. 28 and 29 show an actuating element 2000 of a transmission 2099. For the purpose of shifting, a central shift and selector shaft 2001 is rotated while it is displaced in the axial direction for the selection operation. Hereby, one of several selector forks 2003 is operated via a shift finger 2002 which is non-rotatably connected to the shaft 2001. Operation is effected by moving the shift finger 2002 with a selector fork 2003. The selector forks 2003 are guided linearly and transmit motion and forces to a sliding sleeve of a synchronizing unit of the transmission. For successively engaging different gears, the selector fork 2003 for the desired gear can be selected by an axial displacement of the central shift and selector shaft 2001.

It depends on the design of the transmission 2099, if the shifting is effected in response to as an axial or angular displacement of the shaft 2001, and if the selection is effected as a result of angular or axial displacement.

A shifting operation with channel selection is subdivided into at least three phases:
1. a first phase wherein a gear is disengaged and the neutral region is reached,
2. a second phase wherein the channel is selected in the neutral region, and
3. a third phase wherein a gear is engaged from neutral.

The apparatus 2000 shows a cam gear 2004 disposed substantially on a drum or on another element, wherein a rotary motion of a lever 2006 is initiated by a pin 2005 controlled by the cam gear 2004. The lever 2004 is rotatable. The rotary motion of the lever 2006 is transmitted to the central selector shaft 2001, for example, in the form of a shifting motion. The central selector shaft 2001 is movable axially of the lever 2006. Rotary motion is transmitted to the central selector shaft 2001 through a key 2019. For the selection operation, the central selector shaft 2001 can be moved up and down linearly as well as axially.

The linear and axial movements of the central selector shaft 2001 are initiated by a feed screw, wherein the shaft 2009a or motor 2007 is simultaneously the nut for the feed screw 2008. The feed screw 2008 is non-rotatably connected to an element 2011. A spring 2010 is clamped between a collar of the element 2011 and a hold-down 2015 by way of a lock nut 2017, with intermediate rings 2013 and 2014 operating between the spring and the seating surfaces. The element 2011 is non-rotatably secured to the central selector shaft 2001 through a nut and a locating pin 2018 (FIG. 29) for preventing rotation of the feed screw/spring combination. The initially stressable or initially stressed resilient package thus consists of the elements 2011, 2010, 2013, 2014, 2015, 2017 and 2008 and is preferably received or held by the central selector shaft 2001 and secured by an inner nut 2016.

When the feed screw 2008 is stressed in the axial direction, the force is transmitted through the nut 2017, the hold-down 2015 and the intermediate ring 2014 to the spring 2010 which later is supported by the intermediate ring 2013 on the top surface of the central selector shaft 2001. When the feed screw 2008 is pulled, a force is transmitted through the top surface of element 2011 and the intermediate ring 2013 to the spring 2010. The spring is supported by the intermediate ring 2014, which in turn is supported by the nut 2016 and thus by the centrals elector shaft 2001. As a result, the energy storing device, such as the spring 2010, acts in both axial directions between the actuating means and the central selector shaft 2001.

FIG. 29 shows a section of the arrangement including the energy storing device 2010 in the region of the central selector shaft 2001.

By disposing the spring (energy storing device) 2001 in the path of the selection effecting means, a faster response time for actuating the selection process can be selected while the drive motor for controlling the selection process may be reduced in size.

The energy storing device may be of a coil spring or a disc spring or a package of disc springs, a plastic spring, an elastomer, or a pressurized gas storage device, for example in a hydraulic system, or in the form of a compression or tension spring. Such energy storing device may be initially stressed or unstressed, or it may be received in a seat with play.

In accordance with the invention, the energy storing device may be installed at different locations in the force transmission path for the selection operation. Such energy storing device may be mounted in the central selector shaft or it may be connected to the central selector shaft, for example, by way of a lever or a linkage or a reversing lever, or within a gear. The energy storing device may be disposed in external selection actuating means or in a support for activating the selection actuating means.

What is claimed is:

1. A power train for use in a motor vehicle, comprising:
   a transmission shiftable into and from a plurality of different gears;
   a torque transmitting clutch;
   at least one mobile element actuatable to shift said transmission into and from selected ones of said plurality of different gears; and at least one actuator for said mobile element, comprising at least one drive unit and means for transmitting motion between said at least one drive unit and said at least one mobile element, said motion transmitting means including at least one elastic portion, wherein said transmission has a plurality of shift channels for said at least one mobile element and at least one gear accessible within each of said channels, said at least one drive unit comprising a device for moving said at least one mobile element into and from selected ones of said channels and a device for moving said at least one mobile element into and from a gear in a selected channel.

2. The power train of claim 1, wherein said motion transmitting means comprises at least one actuating member and said at least one elastic portion forms part of said at least one actuating member.

3. The power train of claim 1, wherein said at least one elastic portion includes at least one spring which stores energy during actuation of said at least one mobile element.

4. The power train of claim 1, wherein said at least one elastic portion includes at least one spring which stores energy prior to, during, and subsequent to transmission of motion from said at least one drive unit to said at least one mobile element.

5. The power train of claim 1, wherein said at least one elastic portion is disposed in a path between said at least one mobile element and at least one of said drive units.

6. The power train of claim 1, wherein said at least one elastic portion is provided at a joint of said motion transmitting means.

7. The power train of claim 1, wherein said motion transmitting means is movable along a predetermined path and said at least one actuator further comprises at least one stop for limiting the movements of said motion transmitting means along said path, said at least one elastic portion being located at said at least one stop.

8. The power train of claim 1, wherein said at least one elastic portion is adjacent said at least one mobile element.

9. The power train of claim 1, wherein said motion transmitting means includes a first part receiving motion from said at least one drive unit and a second part transmitting motion to said at least one mobile element, said at least one elastic portion being disposed between said first and second parts.

10. The power train of claim 1, wherein said at least one elastic portion includes a plurality of discrete springs.

11. The power train of claim 1, wherein said motion transmitting means further comprises at least one part which is arranged to perform at least one of substantially linear and angular movements relative to said at least one elastic portion.

12. The power train of claim 1, wherein said motion transmitting means further comprises a plurality of parts at least one of which is arranged to perform at least one of substantially linear and angular movements relative to said at least one elastic portion.

13. The power train of claim 1, wherein said motion transmitting means further comprises a plurality of parts including at least one first part arranged to perform at least one of substantially linear and angular movements and connects said at least one elastic portion with said at least one mobile element, and at least one mobile second part connecting said at least one elastic portion with said at least one drive unit.

14. The power train of claim 1, wherein said motion transmitting means further comprises a plurality of parts defining at least one receptacle for said at least one elastic portion.

15. The power train of claim 14, wherein said parts of said motion transmitting means are movable relative to each other and said at least one elastic portion is arranged to move said parts relative to each other.

16. The power train of claim 15, wherein said motion transmitting means further comprises means for limiting the extent of movability of said parts relative to each other by said at least one elastic portion.

17. The power train of claim 15, wherein said parts of said motion transmitting means have at least substantially unrestricted freedom of movability relative to each other under the action of said at least one elastic portion.

18. The power train of claim 17, wherein said motion transmitting means further comprises at least one slip clutch between said parts.

19. The power train of claim 1, wherein said at least one elastic portion is arranged to store variable amounts of energy and said motion transmitting means further comprises a plurality of parts movable relative to each other under the action of said at least one elastic portion when said at least one elastic portion stores a predetermined amount of energy.

20. The power train of claim 1, wherein said at least one elastic portion comprises at least one spring.

21. The power train of claim 20, wherein said at least one spring is one of a compression spring, a tension spring, a coil spring, a diaphragm spring, a leg spring and a beam spring.

22. The power train of claim 1, wherein said at least one elastic portion comprises at least one plastic compound.

23. The power train of claim 1, wherein said at least one elastic portion contains an elastomeric material.

24. The power train of claim 1 wherein said at least one elastic portion comprises an energy storing device.

25. The power train of claim 1, wherein said at least one elastic portion is deformable and said motion transmitting means further comprises means for limiting the extent of deformability of said at least one elastic portion.

26. The power train of claim 25, wherein said means for limiting comprises at least one abutment for said at least one elastic portion.

27. The power train of claim 1, wherein said at least one elastic portion has a characteristic curve having at least one step.

28. The power train of claim 1, wherein said at least one elastic portion is installed in said actuator with play.

29. The power train of claim 1, wherein said at least one elastic portion is installed in said actuator without play.

30. The power train of claim 1, wherein said motion transmitting means further comprises at least two parts which are movable relative to each other against the resistance of said at least one elastic portion, said at least one elastic portion having a characteristic curve including an essentially increasing branch during movement of said at least two parts relative to each other.

31. The power train of claim 1, wherein said motion transmitting means further comprises at least two parts which are movable relative to each other against the resistance of said at least one elastic portion, said at least one elastic portion having a characteristic curve including an essentially constant branch during movement of said at least two parts relative to each other.

32. The power train of claim 1, wherein said motion transmitting means further comprises a plurality of parts and said at least one elastic portion is installed in said motion transmitting means with predetermined play relative to said parts, said at least one elastic portion having a characteristic curve including at least one portion indicative of the absence of force transmission by said at least one elastic portion due to said play.

33. The power train of claim 1, wherein said at least one elastic portion is arranged to transmit a variable force between said at least one drive unit and said at least one mobile element during shifting of said transmission, and further comprising signal generating means for monitoring said force.

34. The power train of claim 1, wherein said at least one elastic portion is arranged to cover a variable distance between said at least one drive unit and said at least one mobile element during shifting of said transmission, and further comprising signal generating means for monitoring said variable distance.

35. The power train of claim 1, wherein said motion transmitting means further comprises at least one gearing.

36. The power train of claim 35, wherein said gearing is a variable-RPM gearing.

37. The power train of claim 35, wherein said gearing is a variable-ratio gearing.

38. The power train of claim 1, wherein said at least one drive unit is one of (a) mechanical, (b) electromotoric, (c) hydraulic, (d) pneumatic, and (e) spring-operated drive units.

39. The power train of claim 1, wherein said motion transmitting means further comprises at least one of (a) a linkage, (b) a fluid-operated motion transmitting device, (c) at least one lever, and (d) at least one Bowden wire.

40. The power train of claim 1, wherein said at least one mobile element is disposed in said transmission and comprises at least one of (a) a shifting fork, (b) a shifting shaft, (c) a shifting rod, and (d) a shifting sleeve.

41. The power train of claim 1, wherein said motion transmitting means further comprises at least one of (a) a shifting shaft, (b) a shifting rod, (c) a roller, (d) a crank drive, and (e) a shifting lever.

42. The power train of claim 1, wherein said at least one elastic portion constitutes at least a part of said motion transmitting means.

43. A method of operating a power train in a motor vehicle wherein the power train comprises a torque transmitting clutch, a transmission shiftable into a plurality of different gears, and at least one mobile element for shifting the transmission into selected ones of said plurality of gears, comprising the steps of: shifting the transmission into a selected one of said plurality of different gears by way of the at least one mobile element, including providing for the at least one mobile element at least one actuator having at least least one drive unit and at least one at least partially elastic motion transmitting connection between the at least one drive unit and the at least one mobile element.

44. The method of claim 43 of operating a power train wherein the transmission is shiftable into and from a neutral gear and a plurality of additional gears, wherein said shifting step includes shifting the transmission first into the neutral gear and thereupon into a selected one of said plurality of additional gears.

45. The method of claim 43 of operating a power train wherein the transmission is shiftable into and from a neutral gear and a plurality of additional gears, wherein said shifting step comprises causing the at least one at least partially elastic motion transmitting connection to store energy during shifting into said neutral gear.

46. The method of claim 43 of operating a power train wherein the transmission is shiftable into and from a neutral gear and a plurality of additional gears, wherein said shifting step comprises shifting from the neutral gear at least partially into at least one of said additional gears under the bias of the at least one at least partially elastic motion transmitting connection.

47. The method of claim 43 of operating a power train wherein the transmission is shiftable into and from a neutral gear and a plurality of additional gears, wherein said shifting step includes operating the at least one drive unit to move the at least one mobile element against a stop and to thereupon cause the at least one at least partially elastic motion transmitting connection to store energy while the at least one mobile element abuts the stop and the operation of the at least one drive unit continues.

48. A power train for use in a motor vehicle, comprising:
a transmission shiftable into and from a plurality of different gears;
a torque transmitting system; at least one mobile element actuatable to shift said transmission into and from selected ones of said plurality of different gears; and at least one actuator for said mobile element, comprising at least one drive unit and means for transmitting motion between said at least one drive unit and said at least one mobile element, said motion transmitting means including at least one elastic portion and at least two parts which are movable relative to each other against the resistance of said at least one elastic portion, said at least one elastic portion having a characteristic curve including an essentially increasing branch during movement of said at least two parts relative to each other.

49. A power train for use in a motor vehicle, comprising:

a transmission shiftable into and from a plurality of different gears;

a torque transmitting clutch;

at least one mobile element actuatable to shift said transmission into and from selected ones of said plurality of different gears; and at least one actuator for said mobile element, comprising at least one drive unit and means for transmitting motion between said at least one drive unit and said at least one mobile element, said motion transmitting means including at least one elastic portion and at least two parts which are movable relative to each other against the resistance of said at least one elastic portion having a characteristic curve including an essentially constant branch during movement of said at least two parts relative to each other, wherein said transmission has a plurality of shift channels for said at least one mobile element and at least one gear accessible within each of said channels, said at least one drive unit comprising a device for moving said at least one mobile element into and from selected ones of said channels and a device for moving said at least one mobile element into and from a gear in a selected channel.

50. A power train for use in a motor vehicle, comprising:

a transmission shiftable into and from a plurality of different gears;

a torque transmitting clutch;

at least one mobile element actuatable to shift said transmission into and from selected ones of said plurality of different gears; and at least one actuator for said mobile element, comprising at least one drive unit and means for transmitting motion between said at least one drive unit and said at least one mobile element, said motion transmitting means including at least one elastic portion and a plurality of parts, said at least one elastic portion being installed in said motion transmitting means with a predetermined play relative to said parts and having a characteristic curve including at least one portion indicative of the absence of force transmission by said at least one elastic portion due to said play, wherein said transmission has a plurality of shift channels for said at least one mobile element and at least one gear accessible within each of said channels, said at least one drive unit comprising a device for moving said at least one mobile element into and from selected ones of said channels and a device for moving said at least one mobile element into and from a gear in a selected channel.

51. A power train for use in a motor vehicle, comprising:

a transmission shiftable into and from a plurality of different gears;

a torque transmitting system;

at least one mobile element actuatable to shift said transmission into and from selected ones of said plurality of different gears;

at least one actuator for said mobile element, comprising at least one drive unit and means for transmitting motion between said at least one drive unit and said at least one mobile element, said motion transmitting means including at least one elastic portion arranged to transmit a variable force between said at least one drive unit and said at least one mobile element during shifting of said transmission; and signal generating means for monitoring said force.

52. A power train for use in a motor vehicle, comprising:

a transmission shiftable into and from a plurality of different gears;

a torque transmitting system;

at least one mobile element actuatable to shift said transmission into and from selected ones of said plurality of different gears;

at least one actuator for said mobile element, comprising at least one drive unit and means for transmitting motion between said at least one drive unit and said at least one mobile element, said motion transmitting means including at least one elastic portion arranged to cover a variable distance between said at least one drive unit and said at least one mobile element during shifting of said transmission; and signal generating means for monitoring said variable distance.

* * * * *